(12) United States Patent
Pal et al.

(10) Patent No.: US 11,175,152 B2
(45) Date of Patent: Nov. 16, 2021

(54) METHOD AND SYSTEM FOR RISK DETERMINATION OF A ROUTE

(71) Applicant: Zendrive, Inc., San Francisco, CA (US)

(72) Inventors: Jayanta Kumar Pal, San Francisco, CA (US); Vishal Verma, San Francisco, CA (US); Shivam Singh, San Francisco, CA (US); Pankaj Risbood, San Francisco, CA (US); Jonathan Matus, San Francisco, CA (US)

(73) Assignee: Zendrive, Inc., San Francisco, CA (US)

( * ) Notice: Subject to any disclaimer, the term of this patent is extended or adjusted under 35 U.S.C. 154(b) by 0 days.

(21) Appl. No.: 17/111,299

(22) Filed: Dec. 3, 2020

(65) Prior Publication Data

US 2021/0164792 A1 Jun. 3, 2021

Related U.S. Application Data

(60) Provisional application No. 62/942,907, filed on Dec. 3, 2019, provisional application No. 63/051,593, filed on Jul. 14, 2020.

(51) Int. Cl.
*G01C 21/34* (2006.01)
*G06Q 40/08* (2012.01)
*G01C 21/36* (2006.01)

(52) U.S. Cl.
CPC ..... *G01C 21/3461* (2013.01); *G01C 21/3484* (2013.01); *G01C 21/3691* (2013.01); *G06Q 40/08* (2013.01)

(58) Field of Classification Search
CPC ............ G10C 21/3461; G10C 21/3484; G10C 21/3691; G06Q 40/08
See application file for complete search history.

(56) References Cited

U.S. PATENT DOCUMENTS

| 993,203 | A | 5/1911 | Savage |
| 5,673,039 | A | 9/1997 | Pietzsch et al. |
| 6,049,778 | A | 4/2000 | Walker et al. |
| 6,055,477 | A | 4/2000 | McBurney et al. |
| 6,826,477 | B2 | 11/2004 | Ladetto et al. |

(Continued)

FOREIGN PATENT DOCUMENTS

| DE | 3439000 A1 | 4/1986 |
| DE | 102008008555 | 8/2008 |

(Continued)

OTHER PUBLICATIONS

Hon Lung Chu—"In-Vehicle Driver Detection Using Mobile Phone Sensors"—https://ece.duke.edu/sites/ece.duke.edu/files/GWDD2011_Chu.pdf—2011 (Year: 2011).

(Continued)

*Primary Examiner* — Anne Marie Antonucci
(74) *Attorney, Agent, or Firm* — Jeffrey Schox; Caitlin Ploch

(57) ABSTRACT

A method for risk determination of a route includes collecting a set of inputs and determining a set of risk scores. Additionally, the method can include any or all of: processing the set of inputs; organizing the set of inputs; determining a model based on the set of inputs; determining a set of risk scores; producing an outputs based on the set of risk scores; and/or any other suitable processes.

22 Claims, 11 Drawing Sheets

(56) References Cited

U.S. PATENT DOCUMENTS

| | | |
|---|---|---|
| 6,941,222 B2 | 9/2005 | Yano et al. |
| 7,065,449 B2 | 6/2006 | Brewster et al. |
| 7,532,196 B2 | 5/2009 | Hinckley |
| 7,668,931 B2 | 2/2010 | Parupudi et al. |
| 7,801,675 B2 | 9/2010 | Currie et al. |
| 7,881,868 B2 | 2/2011 | Greene et al. |
| 8,054,168 B2 | 11/2011 | McCormick et al. |
| 8,264,375 B2 | 9/2012 | Devries |
| 8,290,480 B2 | 10/2012 | Abramson et al. |
| 8,326,257 B2 | 12/2012 | Shiu et al. |
| 8,352,189 B2 | 1/2013 | Scott et al. |
| 8,369,876 B2 | 2/2013 | Bachmann et al. |
| 8,395,542 B2 | 3/2013 | Scherzinger et al. |
| 8,489,330 B2 | 7/2013 | Ellanti et al. |
| 8,498,610 B2 | 7/2013 | Staehlin |
| 8,504,035 B2 | 8/2013 | Shin et al. |
| 8,521,193 B2 | 8/2013 | Paek et al. |
| 8,577,703 B2 | 11/2013 | McClellan et al. |
| 8,634,822 B2 | 1/2014 | Silver et al. |
| 8,731,530 B1 | 5/2014 | Breed et al. |
| 8,738,523 B1 | 5/2014 | Sanchez et al. |
| 8,754,766 B2 | 6/2014 | Oesterling et al. |
| 8,912,103 B2 | 12/2014 | Heo et al. |
| 8,971,927 B2 | 3/2015 | Zhou et al. |
| 8,972,103 B2 | 3/2015 | Elwart et al. |
| 8,996,234 B1 | 3/2015 | Tamari et al. |
| 9,064,412 B2 | 6/2015 | Baur |
| 9,121,940 B2 | 9/2015 | Psiaki et al. |
| 9,141,974 B2 | 9/2015 | Jones et al. |
| 9,185,526 B2 | 11/2015 | Guba et al. |
| 9,188,451 B2 | 11/2015 | Magnusson et al. |
| 9,221,428 B2 | 12/2015 | Kote et al. |
| 9,222,798 B2 | 12/2015 | Curtis et al. |
| 9,224,293 B2 | 12/2015 | Taylor |
| 9,250,090 B2 | 2/2016 | Hille et al. |
| 9,311,211 B2 | 4/2016 | Chatterjee et al. |
| 9,311,271 B2 | 4/2016 | Wright |
| 9,360,323 B2 | 6/2016 | Grokop |
| 9,368,027 B2 | 6/2016 | Jang et al. |
| 9,390,625 B2 | 7/2016 | Green et al. |
| 9,414,221 B1 | 8/2016 | Simon et al. |
| 9,423,318 B2 | 8/2016 | Liu et al. |
| 9,449,495 B1 | 9/2016 | Call et al. |
| 9,457,754 B1 | 10/2016 | Christensen et al. |
| 9,467,515 B1 | 10/2016 | Penilla et al. |
| 9,495,601 B2 | 11/2016 | Hansen |
| 9,536,428 B1 | 1/2017 | Wasserman |
| 9,558,520 B2 | 1/2017 | Peak et al. |
| 9,566,981 B2 | 2/2017 | Rebhan et al. |
| 9,587,952 B1 * | 3/2017 | Slusar .............. G01C 21/3492 |
| 9,628,975 B1 | 4/2017 | Watkins et al. |
| 9,632,507 B1 | 4/2017 | Korn |
| 9,633,487 B2 | 4/2017 | Wright |
| 9,645,970 B2 | 5/2017 | Boesch et al. |
| 9,650,007 B1 | 5/2017 | Snyder et al. |
| 9,674,370 B2 | 6/2017 | Kim et al. |
| 9,689,698 B2 | 6/2017 | Wesselius et al. |
| 9,716,978 B2 | 7/2017 | Sankaran |
| 9,731,713 B2 | 8/2017 | Horii |
| 9,773,281 B1 | 9/2017 | Hanson |
| 9,794,729 B2 | 10/2017 | Meyers et al. |
| 9,800,716 B2 | 10/2017 | Abramson et al. |
| 9,801,027 B2 | 10/2017 | Levy et al. |
| 9,805,601 B1 | 10/2017 | Fields et al. |
| 9,818,239 B2 | 11/2017 | Pal et al. |
| 9,842,120 B1 | 12/2017 | Siris et al. |
| 9,852,475 B1 | 12/2017 | Konrardy et al. |
| 9,854,396 B2 | 12/2017 | Himmelreich et al. |
| 9,868,394 B1 | 1/2018 | Fields et al. |
| 9,870,649 B1 | 1/2018 | Fields et al. |
| 9,888,392 B1 | 2/2018 | Snyder et al. |
| 9,900,747 B1 | 2/2018 | Park |
| 9,932,033 B2 | 4/2018 | Slusar et al. |
| 9,994,218 B2 | 6/2018 | Pal et al. |
| 10,176,524 B1 | 1/2019 | Brandmaier et al. |
| 10,324,463 B1 | 6/2019 | Konrardy et al. |
| 10,386,192 B1 | 8/2019 | Konrardy et al. |
| 10,510,123 B1 | 12/2019 | Konrardy et al. |
| 10,533,870 B1 | 1/2020 | Slusar |
| 2002/0161517 A1 | 10/2002 | Yano et al. |
| 2003/0018430 A1 | 1/2003 | Ladetto et al. |
| 2004/0046335 A1 | 3/2004 | Knox et al. |
| 2004/0082311 A1 | 4/2004 | Shiu et al. |
| 2005/0080555 A1 | 4/2005 | Parupudi et al. |
| 2005/0093868 A1 | 5/2005 | Hinckley |
| 2005/0197773 A1 | 9/2005 | Brewster et al. |
| 2006/0153198 A1 | 7/2006 | Chadha |
| 2007/0005228 A1 | 1/2007 | Sutardja |
| 2007/0208494 A1 | 9/2007 | Chapman et al. |
| 2007/0208501 A1 | 9/2007 | Downs et al. |
| 2008/0033776 A1 | 2/2008 | Marchese |
| 2008/0103907 A1 | 5/2008 | Maislos et al. |
| 2008/0243439 A1 | 10/2008 | Runkle et al. |
| 2008/0312832 A1 | 12/2008 | Greene et al. |
| 2009/0024419 A1 | 1/2009 | McClellan et al. |
| 2010/0030582 A1 | 2/2010 | Rippel et al. |
| 2010/0056175 A1 | 3/2010 | Bachmann et al. |
| 2010/0100398 A1 | 4/2010 | Auker et al. |
| 2010/0106406 A1 | 4/2010 | Hille et al. |
| 2010/0198517 A1 | 8/2010 | Scott et al. |
| 2010/0219944 A1 | 9/2010 | Mc et al. |
| 2010/0273508 A1 | 10/2010 | Parata et al. |
| 2010/0299021 A1 | 11/2010 | Jalili |
| 2010/0332131 A1 | 12/2010 | Horvitz et al. |
| 2011/0077028 A1 | 3/2011 | Wilkes et al. |
| 2011/0124311 A1 | 5/2011 | Staehlin |
| 2011/0161116 A1 | 6/2011 | Peak et al. |
| 2011/0246156 A1 | 10/2011 | Zecha et al. |
| 2011/0294520 A1 | 12/2011 | Zhou et al. |
| 2012/0050095 A1 | 3/2012 | Scherzinger et al. |
| 2012/0065871 A1 | 3/2012 | Deshpande et al. |
| 2012/0066053 A1 | 3/2012 | Agarwal |
| 2012/0089328 A1 | 4/2012 | Ellanti et al. |
| 2012/0129545 A1 | 5/2012 | Hodis et al. |
| 2012/0136529 A1 | 5/2012 | Curtis et al. |
| 2012/0136567 A1 * | 5/2012 | Wang .............. G08G 1/096741 701/414 |
| 2012/0149400 A1 | 6/2012 | Paek et al. |
| 2012/0158820 A1 | 6/2012 | Bai et al. |
| 2012/0197587 A1 | 8/2012 | Luk et al. |
| 2012/0226421 A1 | 9/2012 | Kote et al. |
| 2012/0245963 A1 | 9/2012 | Peak et al. |
| 2013/0006469 A1 | 1/2013 | Green et al. |
| 2013/0041521 A1 | 2/2013 | Basir et al. |
| 2013/0052614 A1 | 2/2013 | Mollicone et al. |
| 2013/0069802 A1 | 3/2013 | Foghel et al. |
| 2013/0096731 A1 | 4/2013 | Tamari et al. |
| 2013/0124074 A1 | 5/2013 | Horvitz et al. |
| 2013/0130639 A1 | 5/2013 | Oesterling et al. |
| 2013/0204515 A1 | 8/2013 | Emura |
| 2013/0211618 A1 | 8/2013 | Iachini |
| 2013/0302758 A1 | 11/2013 | Wright |
| 2013/0316737 A1 | 11/2013 | Guba et al. |
| 2013/0317860 A1 | 11/2013 | Schumann |
| 2013/0325517 A1 | 12/2013 | Berg |
| 2013/0332357 A1 | 12/2013 | Green et al. |
| 2013/0344856 A1 | 12/2013 | Silver et al. |
| 2014/0038640 A1 | 2/2014 | Wesselius et al. |
| 2014/0046896 A1 | 2/2014 | Potter |
| 2014/0074402 A1 | 3/2014 | Hassib et al. |
| 2014/0081670 A1 | 3/2014 | Lim et al. |
| 2014/0188638 A1 | 7/2014 | Jones et al. |
| 2014/0197967 A1 | 7/2014 | Modica et al. |
| 2014/0207497 A1 | 7/2014 | Collins et al. |
| 2014/0232592 A1 | 8/2014 | Psiaki et al. |
| 2014/0244150 A1 | 8/2014 | Boesch et al. |
| 2014/0244156 A1 | 8/2014 | Magnusson et al. |
| 2014/0288765 A1 | 9/2014 | Elwart et al. |
| 2014/0288828 A1 | 9/2014 | Werner et al. |
| 2014/0358394 A1 | 12/2014 | Picciotti |
| 2015/0025917 A1 | 1/2015 | Stempora |
| 2015/0084757 A1 | 3/2015 | Annibale et al. |
| 2015/0087264 A1 | 3/2015 | Goyal |
| 2015/0097703 A1 | 4/2015 | Baur |

(56) References Cited

U.S. PATENT DOCUMENTS

| | | |
|---|---|---|
| 2015/0229666 A1 | 8/2015 | Foster et al. |
| 2015/0233718 A1 | 8/2015 | Grokop |
| 2015/0246654 A1 | 9/2015 | Tadic et al. |
| 2015/0327034 A1 | 11/2015 | Abramson et al. |
| 2015/0332407 A1 | 11/2015 | Wilson et al. |
| 2015/0334545 A1 | 11/2015 | Maier et al. |
| 2016/0021238 A1 | 1/2016 | Abramson et al. |
| 2016/0033366 A1 | 2/2016 | Liu et al. |
| 2016/0042767 A1 | 2/2016 | Araya et al. |
| 2016/0048399 A1 | 2/2016 | Shaw |
| 2016/0059855 A1 | 3/2016 | Rebhan et al. |
| 2016/0068156 A1 | 3/2016 | Horii |
| 2016/0086285 A1 | 3/2016 | Jordan et al. |
| 2016/0129913 A1 | 5/2016 | Boesen |
| 2016/0150070 A1 | 5/2016 | Goren et al. |
| 2016/0171521 A1 | 6/2016 | Ramirez et al. |
| 2016/0174049 A1 | 6/2016 | Levy et al. |
| 2016/0189303 A1 | 6/2016 | Fuchs |
| 2016/0189442 A1 | 6/2016 | Wright |
| 2016/0225263 A1 | 8/2016 | Salentiny et al. |
| 2016/0232785 A1 | 8/2016 | Wang |
| 2016/0269852 A1 | 9/2016 | Meyers et al. |
| 2016/0272140 A1 | 9/2016 | Kim et al. |
| 2016/0282156 A1 | 9/2016 | Ott et al. |
| 2016/0325756 A1 | 11/2016 | Cordova et al. |
| 2016/0328893 A1 | 11/2016 | Cordova et al. |
| 2016/0339910 A1 | 11/2016 | Jonasson et al. |
| 2016/0358315 A1 | 12/2016 | Zhou et al. |
| 2016/0364983 A1 | 12/2016 | Downs et al. |
| 2016/0379310 A1 | 12/2016 | Madigan et al. |
| 2016/0379485 A1 | 12/2016 | Anastassov et al. |
| 2016/0381505 A1 | 12/2016 | Sankaran |
| 2017/0034656 A1 | 2/2017 | Wang et al. |
| 2017/0053461 A1 | 2/2017 | Pal et al. |
| 2017/0097243 A1 | 4/2017 | Ricci |
| 2017/0103342 A1 | 4/2017 | Rajani et al. |
| 2017/0103588 A1 | 4/2017 | Rajani et al. |
| 2017/0115125 A1 | 4/2017 | Outwater et al. |
| 2017/0116792 A1 | 4/2017 | Jelinek et al. |
| 2017/0124660 A1 | 5/2017 | Srivastava |
| 2017/0126810 A1 | 5/2017 | Kentley et al. |
| 2017/0138737 A1 | 5/2017 | Cordova et al. |
| 2017/0164158 A1 | 6/2017 | Watkins et al. |
| 2017/0178416 A1 | 6/2017 | Barreira Avegliano et al. |
| 2017/0178422 A1 | 6/2017 | Wright |
| 2017/0178424 A1 | 6/2017 | Wright |
| 2017/0210323 A1 | 7/2017 | Cordova et al. |
| 2017/0211939 A1 | 7/2017 | Cordova et al. |
| 2017/0232963 A1 | 8/2017 | Pal et al. |
| 2017/0234689 A1 | 8/2017 | Gibson et al. |
| 2017/0241791 A1 | 8/2017 | Madigan et al. |
| 2017/0279947 A1 | 9/2017 | Rajakarunanayake et al. |
| 2017/0289754 A1 | 10/2017 | Anderson et al. |
| 2017/0369055 A1 | 12/2017 | Saigusa et al. |
| 2017/0371608 A1 | 12/2017 | Wasserman |
| 2018/0061230 A1 | 3/2018 | Madigan et al. |
| 2018/0075309 A1 | 3/2018 | Sathyanarayana et al. |
| 2018/0090001 A1 | 3/2018 | Fletcher |
| 2018/0154908 A1 | 6/2018 | Chen |
| 2018/0165531 A1 | 6/2018 | Sathyanarayana et al. |
| 2018/0174446 A1 | 6/2018 | Wang |
| 2018/0276485 A1* | 9/2018 | Heck ............... G05D 1/0088 |
| 2018/0308128 A1 | 10/2018 | Deluca et al. |
| 2019/0007511 A1 | 1/2019 | Rodriguez et al. |
| 2019/0035266 A1 | 1/2019 | Riess et al. |
| 2019/0281416 A1 | 9/2019 | Watkins et al. |
| 2019/0295133 A1 | 9/2019 | Hirtenstein et al. |

FOREIGN PATENT DOCUMENTS

| | | |
|---|---|---|
| EP | 3534892 A1 | 3/1993 |
| GB | 2492369 B | 4/2014 |
| JP | 2000009482 A | 1/2000 |
| JP | 2002215236 A | 7/2002 |
| JP | 2005098904 A | 4/2005 |
| JP | 2007212265 A | 8/2007 |
| JP | 2009133702 A | 6/2009 |
| JP | 2011133240 A | 7/2011 |
| JP | 2013195143 A | 9/2013 |
| JP | 2013200223 A | 10/2013 |
| KR | 20130106106 A | 9/2013 |
| WO | 2004085220 | 10/2004 |

OTHER PUBLICATIONS

Short et al.—"Identifying Autonomous Vehicle Technology Impacts on the Trucking Industry"—http://atri-online.org/wp-content/uploads/2016/11/ATRI-Autonomous-Vehicle-Impacts-11-2016.pdf (Year: 2016).

Walter D et al: "Novel Environmental Features for Robust Multisensor Navigation", GNSS 2013—Proceedings of the 26th International Technical Meeting of the Satellite Division of the Institute of Navigation, Manassas, VA, Sep. 20, 2013.

"Das Tathagata; et al."PRISM: Platform for Remote Sensing using Smartphones," In. Proc. Mobisys '10, Jun. 15-18, 2010, San Francisco, USA, pp. 63-76.", Nov. 13, 2017 00:00:00.0.

Mohan Prashanth; et al. "Nericell: Rich Monitoring of Road and Traffic Conditions using Mobile Smartphones, SenSys '08, Nov. 5-7, 2008, Raleigh, North Carolina.", Jan. 26, 2018 00:00:00.0.

Giuseppe, Guido , et al., "Using Smartphones As a Tool To Capture Road Traffic Attributes", University of Calabria, Department of Civil Engineering, via p. Bucci, 87036—Rende (CS) Italy, Applied Mechanics and Materials, vol. 432 (2013, Trans Tech Publications, Switzerland, pp. 513-519.

Kalra, Nidhi, Analyzing Driving and Road Events via Smartphone, International Journal of Computer Applications (0975-8887), vol. 98-No. 12, Jul. 2014, pp. 5-9.

* cited by examiner

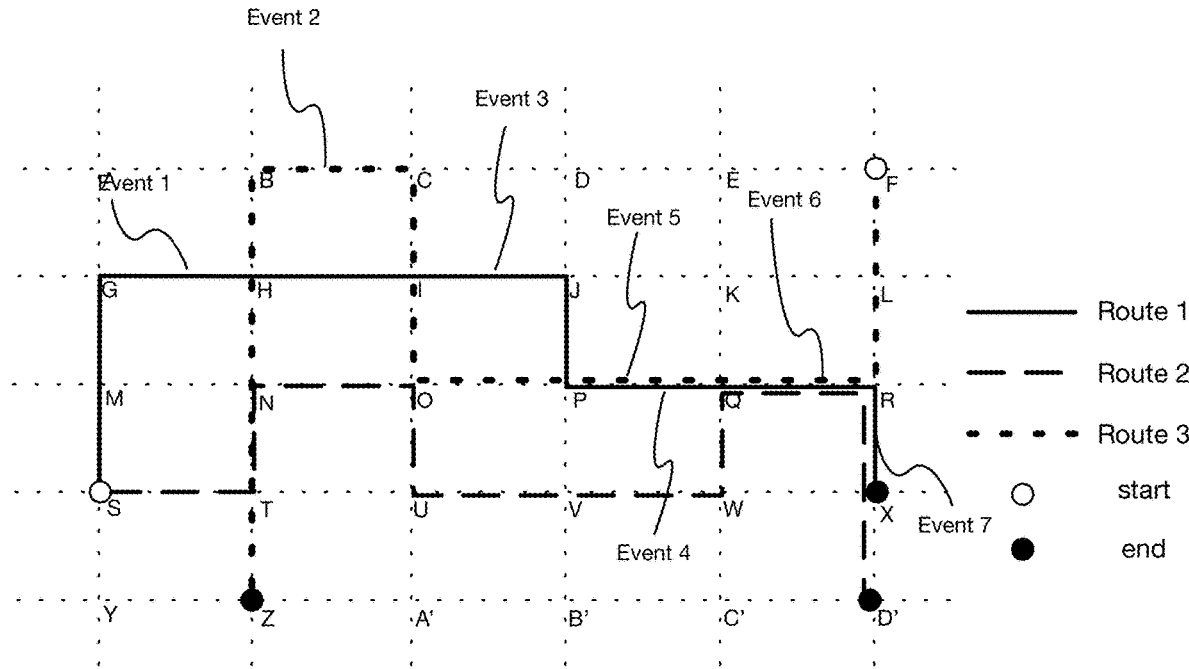

Route 1 route segments:
S-M + intersection M + M-G + intersection G + G-H + intersection H + H-I + intersection I + I-J + intersection J + J-P + intersection P + P-Q + intersection Q + Q-R + intersection R + R-X Route 2 route segments:
S-T + intersection T + T-N + intersection N + N-O + intersection O + O-U + intersection U + U-V + intersection V + V-W + intersection W + W-Q + intersection Q + Q-R + intersection R + R-X + intersection X + X-D'

Route 3 route segments:
F-L + intersection L + L-R + intersection R + R-Q + intersection Q + Q-P + intersection P + P-O + intersection O + O-I + intersection I + I-C + intersection C + C-B + intersection B + B-H + intersection H + H-N + intersection N + N-T + intersection T + T-Z

FIGURE 2

(Route index, geographic unit identifier, time)

Time = $t_1$

| Node A | Node B | Node C | Node D | Node E | Node F |
|---|---|---|---|---|---|
| Node H | Node G | Node J | Node I | Node K | Node M |
| Node L | Node N | Node O | Node P | Node R Event 8 | Edge A-B |
| Edge P-B | Edge B-C | Edge C-D | Edge D-E | Edge E-L | Edge L-N |
| Edge N-F | Edge A-G Event 1 | Edge G-R | Edge R-H | Edge H-I | Edge I-J |
| Edge J-K | Edge D-K | Edge K-M | Edge M-Q | Edge M-O | Edge O-N |

FIGURE 3B

Time = $t_4$

| Node A | Node B | Node C | Node D | Node E | Node F |
|---|---|---|---|---|---|
| Node H | Node G | Node J | Node I | Node K | Node M |
| Node L | Node N | Node O | Node P | Node Q | Edge A-B |
| Edge P-B | Edge B-C | Edge C-D Event 2 Event 3 | Edge D-E | Edge E-L | Edge L-N |
| Edge N-F | Edge A-G | Edge G-R | Edge R-H | Edge H-I | Edge I-J |
| Edge J-K | Edge D-K | Edge K-M | Edge M-Q | Edge M-O | Edge O-N |

FIGURE 3C

Time = $t_5$

| Node A | Node B | Node C | Node D | Node E | Node F |
|---|---|---|---|---|---|
| Node H | Node G | Node J Event 4 | Node I | Node K | Node M |
| Node L | Node N | Node O | Node P | Node Q | Edge A-B |
| Edge P-B | Edge B-C | Edge C-D | Edge D-E | Edge E-L | Edge L-N |
| Edge N-F | Edge A-G | Edge G-R | Edge R-H | Edge H-I | Edge I-J |
| Edge J-K | Edge D-K | Edge K-M | Edge M-Q | Edge M-O | Edge O-N |

FIGURE 3D

Time = $t_6$

| Node A | Node B | Node C | Node D | Node E | Node F |
|---|---|---|---|---|---|
| Node H | Node G | Node J | Node I | Node K | Node M |
| Node L | Node N | Node O | Node P | Node Q | Edge A-B |
| Edge P-B | Edge B-C | Edge C-D | Edge D-E | Edge E-L | Edge L-N |
| Edge N-F | Edge A-G | Edge G-R | Edge R-H | Edge H-I | Edge I-J |
| Edge J-K | Edge D-K | Edge K-M Event 5 Event 6 | Edge M-Q | Edge M-O | Edge O-N |

FIGURE 3E

Time = $t_9$

| Node A | Node B | Node C | Node D | Node E | Node F |
|---|---|---|---|---|---|
| Node H | Node G | Node J | Node I | Node K | Node M |
| Node L | Node N | Node O | Node P | Node Q | Edge A-B |
| Edge P-B | Edge B-C | Edge C-D | Edge D-E | Edge E-L | Edge L-N |
| Edge N-F Event 7 | Edge A-G | Edge G-R | Edge R-H | Edge H-I | Edge I-J |
| Edge J-K | Edge D-K | Edge K-M | Edge M-Q | Edge M-O | Edge O-N |

FIGURE 3F

METHOD AND SYSTEM FOR RISK DETERMINATION OF A ROUTE

CROSS-REFERENCE TO RELATED APPLICATIONS

This application claims the benefit of U.S. Provisional Application No. 62/942,907, filed 3 Dec. 2019, and U.S. Provisional Application No. 63/051,593, filed 14 Jul. 2020, each which is incorporated in its entirety by this reference.

TECHNICAL FIELD

This invention relates generally to the vehicle telematics field, and more specifically to a new and useful method and system for determining the risk associated with a route in the vehicle telematics field.

BACKGROUND

Vehicular collisions are accountable for a significant number of deaths per year, and a high percentage of these collisions can be attributed to the driver's behavior, and also be highly dependent on the particular route that the driver is traversing. While conventional systems and methods can assess and recommend routes to users based on time to destination and/or distance alone, these factors do not reflect the most favorable routes for a user to drive in terms of safety and/or other important factors.

Thus, there is a need in the vehicle telematics field to create a new and useful method and system for identifying and recommending routes to minimize the driver's risk of collision.

BRIEF DESCRIPTION OF THE FIGURES

FIG. 2 depicts a variation of the route segments making up each of a set of routes.

FIGS. 3A-3F depict a variation of the organization and aggregation of data associated with a set of routes traveled by a set of drivers.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
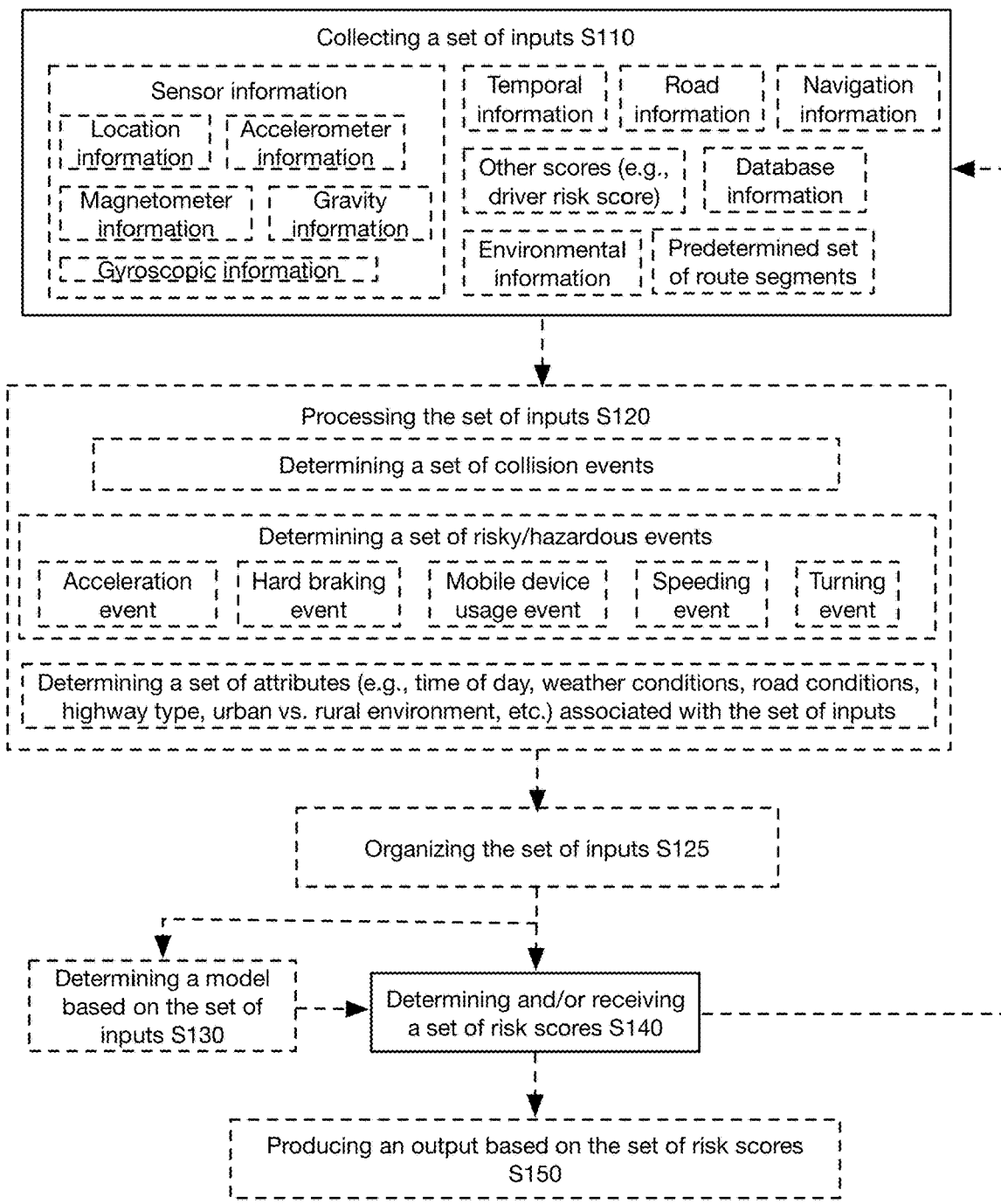
FIG. 1 is a schematic of the method 100 for risk determination of a route.

As shown in FIG. 1, the method 100 for risk determination of a route includes collecting a set of inputs S110 and determining a set of risk scores S140. Additionally, the method 100 can include any or all of: processing the set of inputs S120; organizing the set of inputs S125; determining a model based on the set of inputs S130; determining a set of risk scores 140; producing an outputs based on the set of risk scores S150; and/or any other suitable processes.

Further additionally or alternatively, the method 100 can include any or all of the methods, processes, embodiments, and/or examples described in any or all of: U.S. application Ser. No. 14/566,406, filed 10 Dec. 2014, now issued as U.S. Pat. No. 9,996,811; U.S. application Ser. No. 15/243,513, filed 22 Aug. 2016, now issued as U.S. Pat. No. 9,733,089; U.S. application Ser. No. 15/243,565, filed 22 Aug. 2016, now issued as U.S. Pat. No. 9,818,239; U.S. application Ser. No. 15/702,601, filed 12 Sep. 2017, now issued as U.S. Pat. No. 9,955,319; U.S. application Ser. No. 15/835,284, filed 7 Dec. 2017; U.S. application Ser. No. 15/401,761, filed 9 Jan. 2017, now issued as U.S. Pat. No. 10,154,382, U.S. application Ser. No. 16/022,120, filed 28 Jun. 2018, U.S. application Ser. No. 16/022,184, filed 28 Jun. 2018, now issued as U.S. Pat. No. 10,304,329; U.S. application Ser. No. 16/166,895, filed 22 Oct. 2018, now issued as U.S. Pat. No. 10,559,196; and U.S. application Ser. No. 16/201,955, filed 27 Nov. 2018, now issued as U.S. Pat. No. 10,278,039; each of which is incorporated herein in its entirety by this reference The method 100 is preferably performed with a system as described below, but can additionally or alternatively be performed with any other suitable system(s). Further additionally or alternatively, the method 100 can be performed with any or all of the systems, components, embodiments, and/or examples described in any or all of: the applications described above.

2. Benefits

The method and system can confer several benefits over current systems and methods.

In a first set of variations, the method and/or system confers the benefit of a risk associated with a route and/or route segment based on numerous factors (e.g., human driving behavior, temporal considerations, road infrastructure, etc.), which can in turn be used for multiple different applications, such as in helping drivers make more informed navigation choices. In specific examples, for instance, the method enables drivers to take into account factors beyond time of arrival and distance, such as route safety (e.g., based on predicted risk of collision), when choosing a route to traverse.

In a second set of variations, additional or alternative to those described above, the method and/or system confers the benefit of assessing and/or informing road infrastructure safety. In specific examples, for instance, the risk associated with various features of and/or changes to road infrastructure (e.g., left turn light added to an intersection, 4-way stop changed to a roundabout, etc.) can be determined. In specific examples, this information can be used in any or all of the following: predicting the effect of an infrastructure change prior to implementing it; recommending a change in infrastructure to officials (e.g., city planning officials, civil engineers, etc.); reporting an infrastructure feature associated with a high risk of collision; and/or produce any other suitable outcome(s).

In a third set of variations, additional or alternative to those described above, the method and/or system confers the benefit of leveraging continuously collected data associated with a set of drivers (e.g., aggregated set of drivers, multiple drivers, thousands of drivers, tens of thousands of drivers, etc.), along with location information, to determine and attribute a risk factor to routes in one or more regions and/or throughout the United States and/or within a global framework. In specific examples, different behaviors of drivers collected using telematic data can be used in combination with collision information from one or more databases to determine a model which can accurately quantify and/or predict the risk for a collision at various different locations and/or routes. Additionally or alternatively, this telematic data can be used to update the model.

In specific examples, the method is designed to work with incomplete information associated with the set of drivers, such as incomplete GPS traces of the route driven by the driver, wherein a subset or all of the route segments driven by the user can be determined (e.g., with a map, with driver input, based on previous routes taken by the driver, based on routes from an aggregated set of users, etc.).

In additional or alternative specific examples, the telematic data used to determine the driver behaviors is collected entirely from a mobile device or a supplementary device (e.g., computing device) arranged within and/or retrofitted to the vehicle, wherein, no information is taken from sensors within the vehicle (e.g., OEM sensors) and/or added to the vehicle in the context of an autonomous vehicle.

In a fourth set of variations, additional or alternative to those described above, the method and/or system confers the benefit of better informing human drivers on the risk associated with any or all of: routes they have taken (e.g., which routes commonly taken by the driver are the riskiest), routes they are currently taking (e.g., to dynamically adjust the route in a navigation application, to send a notification to the driver, etc.), and/or routes they may take (e.g., to enable the driver to select one from a set of multiple routes based on the risk score). Additionally or alternatively, any of these benefits can be applied to mitigate risk associated with operation of an autonomous vehicle.

In a fifth set of variations, additional or alternative to those described above, the method and/or system enables the risk determined for routes, route segments, and/or regions to be used in determining one or more outputs for an insurance company, such as an insurance rate and/or insurance rate adjustment based on any or all of: a region in which the driver lives; a common set of routes driven by the driver; the particular driver's behavior relative to the risk of the route; and/or any other suitable information.

Additionally or alternatively, the method and/or system can confer any other suitable benefits.

3. System

The system for route risk determination preferably functions to determine the risk associated with one or more routes and/or route segments. Additionally or alternatively, the system can function to determine the model with which the route risk is determined, produce one or more outputs based on the route risk, perform any or all of the processes of the method 100, and/or perform any other suitable functions. Additionally or alternatively, the method 100 can be performed with any other suitable system(s).

The system for risk determination of a route preferably includes a model (e.g., as described below), wherein the model functions to determine a risk score associated with each of a set of route segments. Additionally or alternatively, the model can function to determine any other suitable outputs, and/or the system can include any other suitable components.

The system can include one or more client applications, such as those executing on a user device, which can function to collect information with which to determine one or more scores as described below, process the information, display or otherwise present an output to a user, and/or perform any other suitable function(s). In preferred variations, for instance, the system includes and/or interfaces with a client application executing on a user device (e.g., mobile device, stationary device, supplementary device, $3^{rd}$ party hardware device such as that placed in a vehicle by an insurance company and/or other entity, etc.) and/or any other suitable components.

The client application can optionally include and/or be in communication with other client applications and/or client application features on a user device (e.g., a navigation client application, a weather client application, a clock client application, etc.). Additionally or alternatively, the client application can operate in absence of communication with other client applications.

The client application is preferably a telematics application, which functions to receive information from one or more sensors (e.g., as described in S110), such as those in a user device, but can additionally or alternatively include any other suitable client applications configured to collect information from any sensor systems (e.g., vehicle sensors such as OEM sensors, radar and/or lidar sensors and/or cameras of an autonomous vehicle, etc.)

The system can optionally include and/or be configured to interface with a user device (e.g., mobile device). The user device can include any or all of: a mobile device (e.g., cell phone, tablet, etc.), a personal user device (e.g., driver's user device, passenger's user device, etc.), a supplementary device (e.g., a $3^{rd}$ party hardware device, etc.), and/or any other suitable devices and/or combination of devices. Examples of the user device include a tablet, smartphone, mobile phone, laptop, watch, wearable device (e.g., glasses), or any other suitable user device. The user device can include any or all of: power storage (e.g., a battery), processing systems (e.g., CPU, GPU, memory, etc.), user outputs (e.g., display, speaker, vibration mechanism, etc.), user inputs (e.g., a keyboard, touchscreen, microphone, etc.), a location system (e.g., a GPS system), sensors (e.g., optical sensors, such as light sensors and cameras, orientation sensors, such as accelerometers, gyroscopes, and altimeters, audio sensors such as microphones, magnetometers, gravitational sensors, etc.), data communication system (e.g., a WiFi transceiver(s), Bluetooth transceiver(s), cellular transceiver(s), etc.), or any other suitable component.

Additionally or alternatively, a supplementary device can be different from and/or separate from other user devices (e.g., wherein the user device is owned by the driver and/or passenger and wherein the supplementary device is owned by a $3^{rd}$ party entity such as an insurance company and/or private company and/or public company, etc.), and/or the system can include and/or interface with any other suitable devices.

The system can optionally include and/or be configured to interface with a sensor system (e.g., as part of a user device, separate from a user device, as part of a supplementary device, separate from a supplementary device, as part of the vehicle such as an OEM sensor system, etc.), which can include any or all of: motion sensors (e.g., accelerometer, gyroscope, magnetometer, orientation sensor, etc.), which can function to detect any or all of: user device movement, user device orientation, vehicle movement, vehicle orientation, position of user device within the vehicle, and/or any other suitable information; proximity sensors (e.g., optical sensors, capacitive sensors, etc.), which can function to detect and/or classify a user's handling of a user device; location sensors (e.g., GPS); any or all of the sensors described above; any or all of the sensors described below; and/or any other suitable sensors. In preferred variations, the set of sensors includes any or all of: a GPS sensor, an accelerometer, a gyroscope, a magnetometer, and a gravity sensor. Additionally or alternatively, the sensor system can include any other suitable sensors.

In a first set of variations, the system includes a set of sensors onboard a user device (e.g., placed within the vehicle, coupled to the vehicle, secured to an interior surface of the vehicle, secured to an exterior surface of the vehicle, etc.), wherein the sensors onboard the user device are used to collect inputs (e.g., as described in S110) with which to determine a set of driving events associated with a driver of the vehicle and/or the vehicle (e.g., an autonomous vehicle). Additionally or alternatively, inputs can be collected from any other sensors and/or components, such as any or all of: the vehicle itself (e.g., from Original Equipment Manufacturer [OEM] sensors, from a speedometer of the vehicle, from an accelerometer of the vehicle, from a scale for determining the cargo load of a truck, from a weight sensor, etc.), supplementary sensors added to (e.g., fixed to, coupled to an exterior of, etc.) the vehicle (e.g., radar sensors, lidar sensors, cameras, etc.), and/or any other suitable sensors.

In a set of specific examples, the set of inputs used to determine a set of driving events are collected only from a personal user device (e.g., mobile phone, etc.) associated with the driver and/or a passenger of the vehicle. In another set of specific examples, the set of inputs used to determine a set of driving events are collected only from a supplementary device, such as a 3$^{rd}$ party device with a set of sensors and a processing subsystem and/or computing subsystem, removably coupled to the vehicle (e.g., removably coupled to a charging port of the vehicle).

Additionally or alternatively, the sensors can be from any devices and/or combination of devices.

The system preferably includes and/or interfaces with a vehicle, wherein the vehicle can be an automotive vehicle (e.g., a car, truck, SUV, etc.), a light electric vehicle (e.g., an electric bike, an electric scooter, an electric skateboard, any other suitable electric vehicle that is configured to carry at least one human, etc.), an aerial vehicle (e.g., a fixed wing aircraft, a rotary wing aircraft, a drone, a hovercraft, etc.), a mass transit land vehicle (e.g., a bus, a locomotive train, a light-rail train, etc.), an aquatic vehicle (e.g., a pleasure craft, a ferry, a hydrofoil craft, etc.), and/or any other suitable vehicle. The vehicle is preferably configured to be driven by a human operator (e.g., under manual operation, under semi-autonomous operation, etc.), but can additionally or alternatively be configured to be driven under autonomous operation, and/or any combination.

The system further preferably includes and/or interface with a computing subsystem, wherein the computing subsystem functions to perform any or all of: processing of the set of inputs; organization of the set of inputs; implementing any or all of a model; determination of a set of risk scores; producing an output based on the set of risk scores; and/or can be used to perform any other processes and/or combination of processes. The computing subsystem is preferably arranged at least partially remotely (e.g., at a remote computing subsystem, cloud computing subsystem, etc.), but can additionally or alternatively be arranged locally (e.g., at an onboard computing subsystem of the user device, at a computing subsystem of the vehicle, etc.), and/or at any other suitable locations. Additionally or alternatively, the computing subsystem can be arranged at any or all of: one or more system components, remotely arranged, distributed among multiple components and/or remotely arranged, and/or otherwise arranged. such as an onboard computing subsystem of a user device in communication with a remote computing subsystem.

In preferred variations, a model used to determine a set of risk scores and/or one or more outputs of the model (e.g., lookup table of risk scores, set of predetermined route segments and associated risk scores, etc.) is located (e.g., stored, referenced from, etc.) at a remote computing subsystem, wherein a computing subsystem of the user device is in communication with the remote computing subsystem, such that the user device can transmit sensor information and/or driving events (e.g., determined at the onboard computing subsystem, determined at the remote computing subsystem, etc.) to the remote computing subsystem for processing (e.g., by the model, based on outputs of the model such as a set or risk scores, etc.). Additionally or alternatively, the model and/or one or more model outputs can be located locally (e.g., stored at a client application, stored at a user device, etc.) and/or any other computing subsystems can be implemented.

The computing subsystem can include any suitable subcomponents, such as a any or all of: memory, storage, processing (e.g., CPUs, GPUs, processes, system-on-a-chip, etc.), and/or any other suitable components.

Additionally or alternatively, the system can include any other suitable components.

4. Method

As shown in FIG. 1, the method 100 for risk determination of a route includes collecting a set of inputs S110 and determining a set of risk scores S140. Additionally, the method 100 can include any or all of: processing the set of inputs S120; organizing the set of inputs S125; determining a model based on the set of inputs S130; determining a set of risk scores 140; producing an outputs based on the set of risk scores S150; and/or any other suitable processes.

Further additionally or alternatively, the method 100 can include any or all of the methods, processes, embodiments, and/or examples described in any or all of the applications described above.

The method 100 functions to assess a risk associated with a particular route, which can subsequently used to produce one or more outputs based on the risk, such as, but not limited to, any or all of: an informed selection of a route by a driver; the providing of navigation instructions which align with an optimal route in light of its risk; a notification to a driver and/or other entities related to the risk of the route; informed decision making by one or more entities (e.g., insurance companies, infrastructure agencies, etc.) in light of the risk of a route; and/or the method 100 can function to produce any other suitable outputs. Additionally or alternatively, the method 100 can function to produce and/or validate a model with which to determine the risk associated with a route and/or a set of route segments (equivalently referred to herein as route links and/or road links). Further additionally or alternatively, the method 100 can function to perform any other suitable functions.

The method 100 is preferably performed with a system as described above, but can additionally or alternatively be performed with any other suitable system(s).

4.1 Method: Collecting a Set of Inputs S110

The method 100 includes collecting a set of inputs S110, which functions to collect information with which to ultimately one or more outputs based on a set of risk scores. Additionally or alternatively, S110 can function to collect information with which to determine a model and/or a set of model parameters (e.g., set of weights) used to determine the set of risk scores, collect information with which to update a model, and/or can perform any other suitable functions.

S110 is preferably performed contemporaneously with (e.g., prior to, during, partially overlapping with, fully overlapping, after, etc.) the traversal of a route by a driver, such as at any or all of: prior to initiation of the route (e.g., as the driver is entering a destination into a navigation application, as the drive is entering the vehicle, upon initial movement of the vehicle, etc.); at initiation of the route (e.g., upon initial movement of the vehicle); while the vehicle is traversing the route; at determination of the route (e.g., until determining that the vehicle has ceased motion, until determining that a predetermined time has passed since the vehicle has ceased motion, etc.); and/or at any other suitable time(s). Additionally or alternatively, S110 can be performed at any other suitable time(s).

S110 is preferably performed at least once during the method 100, and additionally or alternatively any or all of: multiple times (e.g., continuously, at a predetermined frequency, prior to any or all of the processes, during any or all of the processes, after any or all of the processes, etc.). Further additionally or alternatively, the method 100 can be performed in absence of S110.

In preferred variations in which an output is produced by a set of risk scores, S110 can be collected at any or all of these times (e.g., depending on what output is desired). In specific examples in which route options are provided to a user and/or automatically selected based on risk, S110 can, for instance, be performed prior to traversal of the route when a user is entering a destination into a navigation client application. Additionally or alternatively, S110 can be performed any or all of: throughout the traversal of the route (e.g., continuously, at a predetermined frequency, etc.), at all times (e.g., checking at a predetermined frequency to see if vehicle is moving), in response to a trigger, and/or at any other suitable times.

In preferred variations in which a model is determined for assigning a risk score to a route and/or set of route segments, inputs are preferably collected multiple times for an aggregated set of users, such as continuously (e.g., at a predetermined frequency) while the user is driving and/or the vehicle is in operation.

S110 preferably includes collecting data associated with a set of route segments, which functions to provide information with which a determination of route risk (and/or inversely route safety) can be determined. Additionally or alternatively, S110 can function to provide information with which a determination of driver safety can be determined and/or produce any other suitable output(s), such as any or all of those described in subsequent processes of the method.

A route herein refers to a particular course traversed by a vehicle during a trip, wherein a trip is preferably defined by a starting point and an ending point (equivalently referred to herein as a destination), but can additionally or alternatively be defined in any other suitable way(s). The route can include any suitable roadways and combinations of roadways, such as any or all of: highways, motorways, residential roads, service roads, and/or any other suitable roadways.

Each route is preferably defined by a set of route segments, which serve as "building blocks" for constructing the route traversed by the vehicle during its trip. The route segments are preferably virtual representations of a portion of a roadway, but can additionally or alternatively include one or more tangible components, such as the corresponding portion of the roadway. The route segments are preferably defined such that they can construct numerous possible routes through the modular combination of adjacent route segments, wherein any route is constructed from a series of route segments. In some variations, for instance, the set of possible route segments optionally includes intersections as a first subset of route segments and includes the portions of road connecting the intersections as a second subset of route segments. Intersections can refer to any or all of: traffic light intersections, stop sign intersections (e.g., 2-way stops, 4-way stops, etc.), roundabouts, highway features (e.g., on ramps, off ramps, congested and/or otherwise complicated areas, etc.), intersections associated with yield signs, and/or any other suitable road infrastructure features. In at least the second subset of road segments, the road segments can be variable in length. In some examples, for instance, the roadway between two intersections is defined as a single route segment. Additionally, the first subset of route segments can be variable in length. Additionally or alternatively, however, any or all of the route segments can be defined to be uniform or substantially uniform (e.g., defining a distance below a predetermined threshold, defining a distance above a predetermined threshold, defining a distance between a minimum threshold and a maximum threshold, etc.). Further additionally or alternatively, the route segments can be otherwise defined.

In preferred variations, for instance, a route traveled by a vehicle is defined as a sequence of route segments, wherein each of the sequence of route segments is defined as at least one of: a segment of a road and an intersection. In a specific example, the set of route segments from which a sequence of route segments is chosen includes a set of intersections in a geographic region along with the sections of road which connect the intersections, wherein the section of road connecting two intersections preferably forms a single route segment, but can additionally or alternatively form multiple route segments. In a second specific example, the set of route segments from which the sequence of route segments is chosen includes a set of intersections along with the sections of road which connect the intersections, wherein the section of road connecting two intersections can form any number of route segments such that each route segment is of a uniform length or a substantially uniform length (e.g., within a set of distance/length thresholds). Additionally or alternatively, the route segments can include only the segments connecting intersections, only the intersections, and/or can be otherwise defined.

In a first set of variations, S110 includes collecting a set of route segment parameters, such as route segment identifiers (route segment IDs) and/or any other parameters associated with a particular route segment (e.g., location(s), distance, estimated millions of miles traveled on route segment per year, etc.). In specific examples, the route segment parameters are collected when determining the model and optionally when determining a set of one or more outputs, which can function to perform any or all of: informing data organization of other inputs (e.g., assign sensor information to the proper route segment based on location information collected at a user device); determine the risk associated with the route segment; and/or perform any other suitable functions.

The route segment parameters are preferably predetermined and collected from a database, such as a map database (e.g., OpenStreetMap [OSM] database, navigation/map client application database, privately owned database, publicly owned and/or available database, etc.). Additionally or alternatively, the route segment parameters can be received from any other suitable sources, dynamically determined (e.g., during the method 100, prior to the method 100, etc.), and/or otherwise determined.

At least a portion of the set of inputs includes sensor inputs collected from a sensor system (e.g., from a user device, from the vehicle, etc.) such as from any or all of: a GPS sensor, accelerometer, gyroscope, magnetometer, gravitational sensor, and/or any other suitable sensors. Additionally or alternatively, any or all of the data can be collected from a processing system (e.g., system on a chip, integrated circuit, CPU, etc.) of the user device, a remote computing system (e.g., cloud computing system), the vehicle, a clock (e.g., a real time clock [RTC] of the user device), a secondary client application (e.g., a navigation application, a weather application, etc.) of the user device, and/or any other suitable information source. Additionally or alternatively, the inputs can be otherwise collected. The sensor inputs are further preferably collected at a client application executing on the user device and/or a software development kit (SDK) associated with the client application, but can additionally or alternatively be collected from a remote computing system, remote storage, a remote set of sensors (e.g., external sensors in an environment of the vehicle), and/or at any other suitable component(s).

As shown in FIG. 1, the sensor inputs can include any or all of: location information (e.g., latitude and longitude, GPS coordinates, a GPS trace, a partial GPS trace, a route identifier, a route segment identifier, an address, a vehicle pose, etc.), motion information (e.g., acceleration information, speed and/or velocity information, position-velocity-acceleration [PVA] data, etc.), and/or orientation information (e.g., gyroscopic information, magnetometer information, etc.). Additionally or alternatively, the sensor information can include any or all of: optical information (e.g., from one or more cameras, from a camera of the user device, from a camera fixed to the vehicle, from a camera in an environment of the vehicle, from a stream showing local weather conditions, from a stream showing road conditions, etc.), radar information, lidar information, temperature information (e.g., from a temperature sensor of the user device), humidity information (e.g., from a humidity sensor), pressure information (e.g., to detect a change of pressure of the vehicle such as due to airbag deployment), contact information (e.g., from a contact sensor of the user device to detect device usage/handling, from an optical sensor of the user device to detect device usage/handling, etc.), proximity information (e.g., from a proximity sensor of the vehicle to detect closeness of the vehicle to another vehicle and/or object), and/or any other suitable information from any suitable sensors.

Additionally or alternatively, any other suitable inputs can be collected from any or all of: a client application, a user device, a computing system, a database, and/or any other suitable components. In some variations, for instance, the set of inputs can include any or all of: information associated with a user's usage of a user device (e.g., while driving, client application usage, device handling information, etc.); historical information associated with the user (e.g., historical routes driven by user); vehicle information (e.g., make and model); user preferences (e.g., maximum risk threshold, maximum extra distance willing to be traveled for a safer route, maximum extra time willing to be spent for a safer route, etc.); and/or any other suitable inputs.

The sensor inputs can be collected continuously (e.g., for the duration of the trip, while the vehicle is moving, while the vehicle has a speed above a predetermined threshold, etc.), at a predetermined frequency, intermittently, in response to a trigger, and/or collected at any suitable time(s) (e.g., as described above).

The set of inputs preferably includes location information (e.g., from the sensor system, from a database, from another source, etc.), such as Global Positioning System (GPS) information and/or Geographic Information System (GIS) information, which functions to properly locate and assign the risk scores determined in subsequent processes of the method. In preferred variations, for instance, sensor data is collected from one or more sensors of the user device (e.g., accelerometer data, orientation data, etc.) while the vehicle is driving, location data is collected from a GPS system (e.g., of the user device, of the vehicle, etc.) contemporaneously with the sensor data, and the sensor data and the location data are attributed to (e.g., assigned to) road infrastructure (e.g., routes, roadways, intersections, etc.), such as a route segment (e.g., predetermined route segment as described above), through GIS information and any number of GIS tools (e.g., lat-long variable, Geo-hash, etc.). Additionally or alternatively, the location information can be otherwise suitably used.

The location information can additionally include traffic and/or route information, such as any or all of: a speed limit associated with the route; road conditions associated with the route (e.g., smooth surface, potholes, clarity of lane markings such as lane lines, curvature around turns, etc.); a level of traffic associated with the route; a temporary or permanent zoning associated with the route (e.g., pedestrian zone, biking zone, school zone, hospital zone, construction, residential zone, high density residential zone, etc.); infrastructure features associated with the route (e.g., traffic intersection with or without traffic lights, traffic intersection with or without stop signs, highway entry and/or exit ramps, etc.), and/or any other suitable information.

The location information can be any or all of: predetermined (e.g., a prescribed speed limit); dynamically determined (e.g., based on information collected at one or more sensors of a sensor subsystem such as a camera); determined from an information source (e.g., internet, secondary client application, etc.); determined in any suitable combination of these ways; and/or otherwise determined.

In some variations, the location information (e.g., traffic information) is used to determine a volume of traffic per mile associated with the trip, wherein the volume of traffic can include a number of vehicles (e.g., surrounding the vehicle, within a predetermined radius of the vehicle, having a driver with a user device executing the client application and/or SDK, etc.). Additionally or alternatively, the volume of traffic can be determined based on a movement parameter associated with the vehicle (e.g., speed, acceleration, frequency of stops, etc.), and/or any other suitable parameters.

Additionally or alternatively, location information from an aggregated set of drivers can be used when building a model (e.g., as described below) to determine, for instance, any or all of: an average number of miles driven on a particular route segment, a most popular route segment driven by a user, and/or any other suitable information.

The set of inputs can optionally include driver information (e.g., a driver risk score), which functions to determine a driver behavior associated with each of set of drivers, further preferably the riskiness of a driver's behavior (e.g., in the form of a driver risk score), wherein the driver data can include any or all of: vehicle speed (e.g., as compared to the speed limit of the associated route segment); vehicle acceleration (e.g., aggressive acceleration, acceleration above a predetermined threshold, etc.); abrupt changes in driving (e.g., abrupt changes in velocity, abrupt changes in direction, hard turns, etc.); a device usage (e.g., an amount of mobile device usage while driving, a type of mobile device usage while driving, a phone call amount and/or frequency, a texting amount and/or frequency, etc.); vehicle braking (e.g., hard braking); an incidence of collisions, an incidence of near-collisions, and/or any other suitable parameters. The driver information can additionally or alternatively be used for any or all of: adjusting a risk score of a route (e.g., to remove the effects of an always-risky driver who drives on the route, to attribute the riskiness of drivers to the routes they are currently traveling on, etc.), and/or can be used in any other suitable ways.

The driver information can optionally include a driver risk score, wherein the risk score can be determined based on any or all of: a set of algorithms, a set of models (e.g., deep learning models, machine learning models, neural nets, etc.), and/or any other suitable processes. Additionally or alternatively, determining the driver behavior can include any or all of the methods, processes, embodiments, and examples described in U.S. application Ser. No. 15/835,284, filed 7 Dec. 2017, which is incorporated herein in its entirety by this reference.

Determining a driver behavior can optionally include distinguishing a driver from a passenger, such as through any or all of the methods, processes, embodiments, and examples described in U.S. application Ser. No. 16/022,120, filed 28 Jun. 2018, which is incorporated herein in its entirety by this reference.

The data can optionally include temporal information, which functions to determine the contributions that various temporal factors can have on the rating (e.g., riskiness, safety, etc.) of a route. Additionally or alternatively, the temporal information can function to organize and/or categorize any or all of the other data collected, such as in any or all of the processes of S125.

The temporal parameters can include, for instance, any or all of: a time of day at which information is being collected (e.g., morning, afternoon, night, 8 am, 8:15 am, etc.), a time of year at which information is being collected (e.g., particular month, particular season, etc.), and/or any other suitable parameters, which can individually and/or collectively function to assess the risk of a route based on any or all of: traffic (e.g., rush hour) conditions, lighting conditions (e.g., based on time of day and/or time of year), weather conditions (e.g., snow, sun, etc.), and/or any other suitable temporally-related parameters.

The temporal parameters are preferably collected from a clock (e.g., real time clock [RTC]) of a sensor system and/or the user device, but can additionally or alternatively be collected from a remote computing subsystem, a website, and/or any suitable information source.

In some variations, the temporal information functions to organize the other data collected in S110 in a time-slotted fashion (e.g., in 15-minute time slots, in less than 15-minute time slots, in greater than 15-minute time slots, etc.), wherein the time-slots of data can be used to determine a risk score for a route according to the time of day and/or year that the driver is taking the trip.

Additionally or alternatively, the data collected in S110 can include environmental information, such as any or all of: weather (e.g., snow, rain, sleet, fog, etc.), temperature, humidity, light, and/or other suitable information. Further additionally or alternatively, any other suitable data can be collected in S110.

The set of inputs preferably includes inputs from a set of one or more databases (e.g., lookup tables), wherein the database inputs are preferably used in building a model for determining risk scores (e.g., as described below). Additionally or alternatively, this information can be collected from other sources (e.g., from the sensor system inputs) and/or S110 can be performed in absence of collecting database information.

Figure 7:
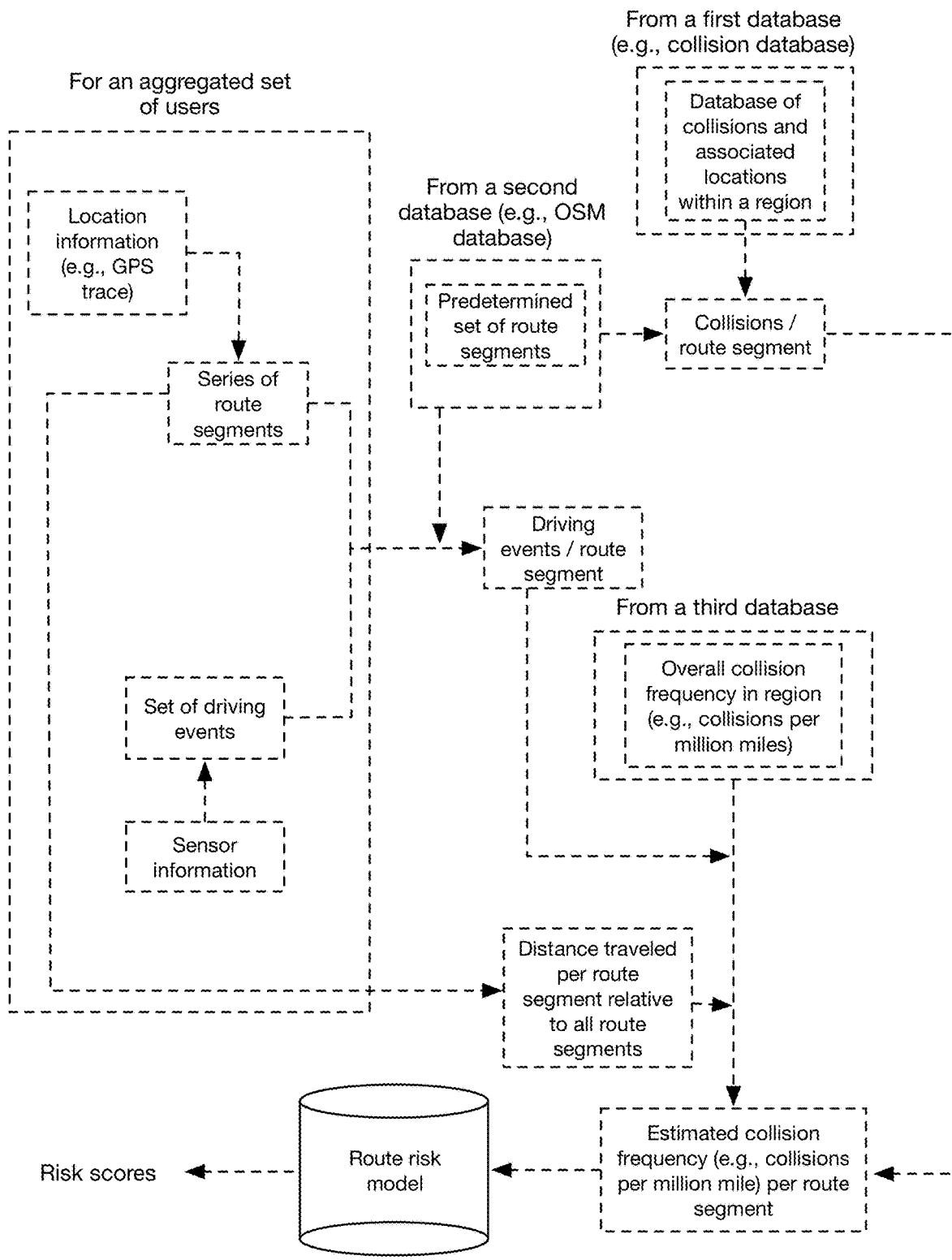
FIG. 7 depicts a schematic variation of a set of inputs used in determining a model for route risk determination.

The set of databases preferably includes one or more databases which include collision information associate with the regions containing the route segments for which risk scores are determined for with a model. These can include (e.g., as shown in FIG. 7), but are not limited to, any or all of: a database indicating the number of collisions occurring in the region (e.g., in the past year, in the past 2 years, annual average, etc.) and the location (e.g., latitude and longitude, GPS coordinates, closest address, route segment identifier, etc.) in which the collision occurred; a database including an overall collision frequency occurring in the region (e.g., collisions per millions of miles) and/or an average number of total miles driven in the region by all vehicles (e.g., number of millions of miles driven annually in the region); a database including the route segment parameters (e.g., OSM database); and/or any other suitable databases.

S110 can optionally include receiving the route risk scores in S140, wherein the route risk scores are preferably determined by a model (e.g., as described below).

Additionally or alternatively, any other suitable inputs can be received in S110 from any suitable sources and/or combination of sources.

In a first set of variations, S110 includes collecting data from a sensor system of the user device, which is subsequently used to determine a set of driving events (e.g., driver's acceleration patterns, driver's hard braking, driver's mobile device usage and interactions, driver's speeding, and driver's dangerous turn patterns) associated with the driver's traversal of a route and location information (e.g., GPS data) characterizing the location of the route, which is subsequently used to associate the inputs with one or more routes segments. Additionally or alternatively, S110 can include collecting database information with which to determine the risk score(s) associated with one or more routes. In specific examples, the data is collected from any or all of: a GPS sensor, an accelerometer, a gyroscope, a magnetometer, and a gravitational sensor of the user device, which can be used to determine any or all of: a driver behavior, a route location, route feature (e.g., traffic), and/or any other suitable information. Additionally, one or more temporal parameters can be determined and/or associated with the data.

In specific examples, the sensor system is part of a mobile user device (e.g., smart phone) of the driver, wherein the mobile user device is arranged within the vehicle (e.g., mounted to a dashboard, in a driver's pocket, on a seat, etc.) during driving.

In additional or alternative specific examples, the sensor system is part of a $3^{rd}$ party device, wherein the $3^{rd}$ party device is arranged within and/or coupled to the vehicle.

Additionally or alternatively, the sensor system can be otherwise distributed among and/or arranged within components.

In a second set of variations, additional or alternative to the $1^{st}$, S110 includes collecting navigation information, such as a destination of the driver, wherein the destination is used subsequently in the method to recommend and/or select a route for the driver based on the risk scores associated with one or more potential routes which can be taken to reach the destination. Additionally or alternatively, S110 can include receiving dynamic navigation and/or location information with which to adjust navigation instructions for the driver (e.g., to adjust to a lower risk route).

In a third set of variations, additional or alternative to those described above, in which a model is subsequently determined, S110 includes collecting sensor information from a set of user devices associated with an aggregated set of multiple drivers (e.g., driving routes freely), along with information from a set of collision databases and a map database identifying a predetermined set of route segments, wherein the model is determined based on the inputs.

Additionally or alternatively, S110 can be otherwise performed.

4.2 Method: Processing the Set of Inputs S120

The method 100 includes processing the set of inputs S120, which functions to interpret the set of inputs and prepare them for use in determining the risk associated with a route and/or a model for determining the risk associated with a route. Additionally or alternatively, S120 can function to clean up (e.g., through signals processing, noise removal, etc.) any or all of the set of inputs, fill in missing information associated with any or all of the set of inputs (e.g., a partial GPS trace), and/or perform any other suitable function(s).

S120 is preferably performed in response to S110, but can additionally or alternatively be performed at any or all of: multiple times throughout the method (e.g., continuously, at a predetermined frequency, etc.), in response to a trigger, and/or at any other suitable times. Further additionally or alternatively, the method 100 can be performed in absence of S120.

S120 is preferably performed at a remote computing system, but can additionally or alternatively be performed at any or all of: a user device (e.g., a processing system of the user device), a client application executing on the user device and/or an SDK associated with the client application, and/or any other computing systems. In preferred variations in which a model is determined, for instance, S120 includes collecting, at a remote computing system, data from a set of multiple user devices associated with a set of users, wherein the data is used to determine a set of events, wherein the set of events are then associated with the proper route segments at which the events occurred.

S120 preferably includes determining a set of driving events based on the set of inputs, which functions to enable risky driver behavior to be detected and used in the determination of the route risk score(s) (and/or the determination of a model used to determine the route risk score(s)). Additionally or alternatively, driving events can be otherwise determined, S120 can be performed in absence of determining driving events, and/or S120 can be otherwise suitably performed.

In some variations, for instance, determining a set of events based on the set of inputs functions to determine actual and potential contributors to the relative safety of route segments, and in turn the risk associated for routes that a driver may traverse and/or is traversing.

The set of inputs used to determine the events preferably includes at least sensor information, further preferably sensor information collected at one or more user devices. Additionally or alternatively, the set of events can be determined based on other sensors, other inputs (e.g., databases), and/or otherwise suitably determined.

The set of events can include actual events, predicted events, or any combination of actual and predicted events.

The set of events can include collision events corresponding to detected collisions, which can be detected through any or all of the methods, processes, embodiments, and examples described in U.S. application Ser. No. 15/243,565, filed 22 Aug. 2016, which is incorporated herein in its entirety by this reference. In variations, for instance, detecting a collision event can include extracting one or more movement features from at least one of a movement dataset and a supplementary dataset, such as from data collected in S110, wherein the movement features are preferably associated with at least one of a position, a velocity, and an acceleration characterizing the movement of the vehicle during a time period. Movement features can include any one or more of: raw movement data (e.g., raw location data, raw motion data, etc.), processed movement data (e.g., through a processing operation described above), movement profiles (e.g., driving profile, braking profile, position profile, speed profile, acceleration profile, turning profile, etc.), identified driving actions (e.g., parking, acceleration, braking, short following, lane-departure, freewheeling, U-turn, left turn, right turn, over-revving, stationary vehicle, moving vehicle, etc.), vehicle motion characteristics, and/or any other suitable features.

In specific examples, detecting a collision event can include calculating a vehicle braking profile and/or stopping distance from movement data (and/or from supplementary data). A vehicle braking profile can be calculated from vehicle deceleration over time. Stopping distance can be calculated from distance traveled between initiation of deceleration and a vehicle stopping.

In other specific examples, detecting a collision event can include identifying or estimating an acceleration feature describing changes in vehicle acceleration.

In yet other specific examples, detecting a collision event can include deriving movement features from any or all of: image and/or video analysis of media captured by one or more cameras associated with the vehicle (e.g., mobile computing device cameras, vehicle cameras, etc.); interpreting speech recorded by microphones of the navigation device to extract driving profile features (e.g., describing driver behavior) and/or detect a sound associated with a collision (e.g., sound of vehicle contact, sound of airbag deployment, etc.); interpreting speech based on meaning (e.g., driver behavior can be detected based on what people say) and/or emotion (e.g., driver behavior can be detected based on identified emotions); extracting a vertical vehicular motion feature (e.g., from vertical accelerometer data) describing motion of the vehicle perpendicular a road surface; determining an accident based on radar and/or lidar information; and/or based on any other suitable information and processes.

The collision events can additionally or alternatively be determined based on other suitable inputs and/or data, such as any or all of: collision data from a news source (e.g., reporting active collisions), a GIS database, historical collision records and/or databases, and/or any other suitable information.

In specific examples, determining collision events includes receiving collision information and the corresponding location of each collision from a collision database and optionally any other information from any databases and/or information sources.

Figure 4:
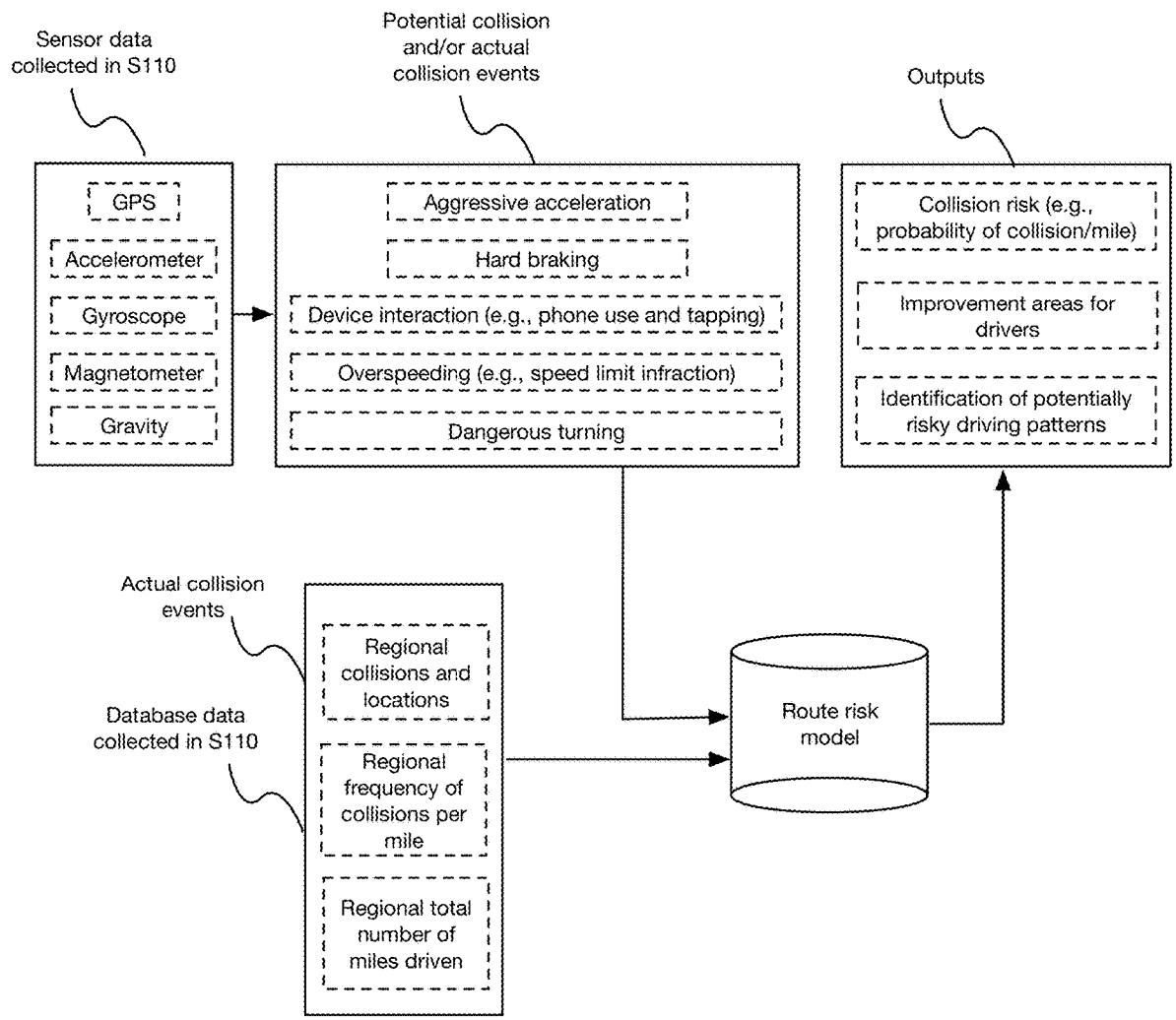
FIG. 4 depicts a schematic of sensor data, events, and outputs of a variation of the method 100.

The set of events further preferably includes a set of potential collision events (e.g., as shown in FIG. 4), equivalently referred to herein as dangerous events and/or risky events, which have a potentially high propensity for causing a collision, and can function to produce a robust method for determining collision risk in absence of a large amount of actual collision event data, since collision events are relatively rare (e.g., conventionally measured as a number of events per million miles). The set of dangerous events need not result in a collision, but can instead be events which are any or all of: involved in a significant percentage of collision events (e.g., percentage above a predetermined threshold); involved in near-miss collision events; involved in minor collision events; involved in major collision events; are reported by a driver; and/or are otherwise classified. Additionally or alternatively, the dangerous events can include actual collision events, such as those described above.

The set of potential collision events is preferably determined, at least in part based on sensor data of the user device, further preferably sensor data described above (e.g., for determining collision events with sensor data), but can additionally or alternatively be determined based on any suitable data and with any or all of: a set of algorithms, a model (e.g., a deep learning model, a predictive model, etc.), pattern matching, and/or any other suitable processes. In preferred variations, the set of potential collision events are preferably determined based on sensor inputs as described above for the collision events, such as through any or all of the methods, processes, embodiments, and examples described in any or all of: U.S. application Ser. No. 15/243,565, filed 22 Aug. 2016; U.S. application Ser. No. 16/700,991, filed 2 Dec. 2019; each which is incorporated herein in its entirety by this reference.

The set of potential collision events can include any or all of: an aggressive acceleration event (e.g., a magnitude of acceleration of the vehicle above a predetermined threshold, a frequency of acceleration above a predetermined threshold, a duration of threshold above a predetermined threshold, etc.); a hard braking event (e.g., a magnitude of braking above a predetermined threshold, a frequency of braking above a predetermined threshold, a duration of braking above a predetermined threshold, etc.); a mobile device interaction event (e.g., a mobile device usage above a predetermined duration of threshold, a frequency of device usage above a predetermined threshold, a duration of device usage above a predetermined threshold, a type of device usage, a percentage of time spent interacting with the user device above a predetermined threshold, etc.); a speeding event (e.g., speed above a speed limit by a predetermined threshold, a duration of speeding above a predetermined threshold, a frequency of speed above a predetermined threshold, etc.); a low speed event (e.g., driving substantially slower than speed limit and/or surrounding traffic, driving substantially slower than the speed limit in absence of traffic and/or inclement weather conditions, etc.); a dangerous turn event (e.g., an unexpected turn direction); a lane change event (e.g., sudden lane change, cutoff of another driver, etc.); a traffic violation (e.g., running a stop sign, running a stop light, etc.); tailgating; and/or any other suitable events.

S120 preferably includes associating each event with a particular route segment at which the event occurred. Establishing this association preferably includes locating the event (e.g., based on location information collected at a user device, based on GIS information, etc.) and assigns it to one of a predetermined set of route segments. In a variation as shown in FIG. 2, for instance, the path traversed by a user during a trip (e.g., Route 1, Route 2, Route 3, etc.) is associated with a set of predetermined route segments (e.g., based on GIS information), wherein the grid represented in FIG. 2 includes a set of nodes (e.g., "A", "B", "C", etc. in FIG. 2), which each correspond to an intersection, and a set of edges (e.g., "S-M", "M-G", "G-H", etc. in FIG. 2), which correspond to non-intersection roadways. The set of events that occur during these trips are then associated with the route segment at which the event occurred.

S120 can additionally or alternatively include processing any or all of the inputs to determine a set of attributes, wherein the set of attributes can be associated with any or all of: one or more collision events (e.g., as a tag associated with the event), one or more potential collision events, and/or one or more route segments. The attributes can include, for instance, but are not limited to, any or all of: a type of road (e.g., highway or not); weather conditions (e.g., raining, snowing, ice on road, inclement weather, non-inclement weather, etc.); traffic information and/or patterns; construction activity (e.g., from a construction feed); road conditions and/or features (e.g., potholes, age/wear of road, pavement vs. asphalt vs. dirt, etc.); road architecture (e.g., hairpin turn); an environment of the vehicle (e.g., urban, rural, residential, school zone, etc.); and/or any other suitable attributes. The set of attributes are preferably used to inform the risk associated with a route (e.g., increase risk of route segments which have a hairpin turn), but can additionally or alternatively be used to build a model in S130 (e.g., to determine a set of weights determined for the model), organize information in S125 (e.g., to organize information based on attributes), and/or be used in any other suitable way(s).

In a first set of variations, S120 includes determining a set of collision events based at least on a set of one or more databases and determining a set of risky/hazardous events (equivalently referred to herein as potential collision events) based one or more sensor inputs collected at a user device. The set of collision events can additionally or alternatively be determined based on the one or more sensor inputs collected at a user device. Further additionally or alternatively, a set of one or more attributes can be determined and associated with the events.

In a set of specific examples (e.g., as shown in FIG. 4), the set of potential collision events includes: an aggressive acceleration event, a hard braking event, optionally a phone interaction event, optionally an overspeeding event, and a dangerous turn event.

In a second set of variations (e.g., as shown in FIG. 4, as shown in FIG. 7, etc.), a model (e.g., as described below) is determined based on the information described in the first set of variations for a set of aggregated users.

4.3 Method: Organizing the Set of Inputs S125

The method 100 can include organizing the inputs based on the set of events and the set of route segments S125, which functions to enable aggregation of data from multiple users and multiple routes, thereby enabling a geographic collision propensity to be determined and used in a model for determining risk route in S130. S125 can additionally or alternatively function to aggregate data based on one or more temporal parameters and/or one or more attributes, such as any or all of the temporal parameters collected in S110.

S125 is preferably performed in response to S120 and with the processed set of inputs, but can additionally or alternatively be performed in response to S110 and/or at any or all of: multiple times throughout the method (e.g., continuously, at a predetermined frequency, etc.), in response to a trigger, and/or at any other suitable times. Further additionally or alternatively, the method 100 can be performed in absence of S125.

S125 preferably includes determining (e.g., assigning) the particular route segment (e.g., from a set of predetermined route segments) at which each event occurs, such that the event and its route segment can be linked (e.g., paired, assigned, etc.). The particular route segment is preferably identified based on location information collected in S110, such as location information collected at a sensor system of a user device. The user device is preferably the same user device which collects the information used to determine one or more of the set of events but can additionally or alternatively include any other suitable sensors and/or devices. Additionally or alternatively, the location information can be predetermined, such as for collision events based on a database. Additionally or alternatively, one or more attributes can be associated with the events and/or the route segments, and/or any other suitable outputs can be produced in S120.

Figure 3A:
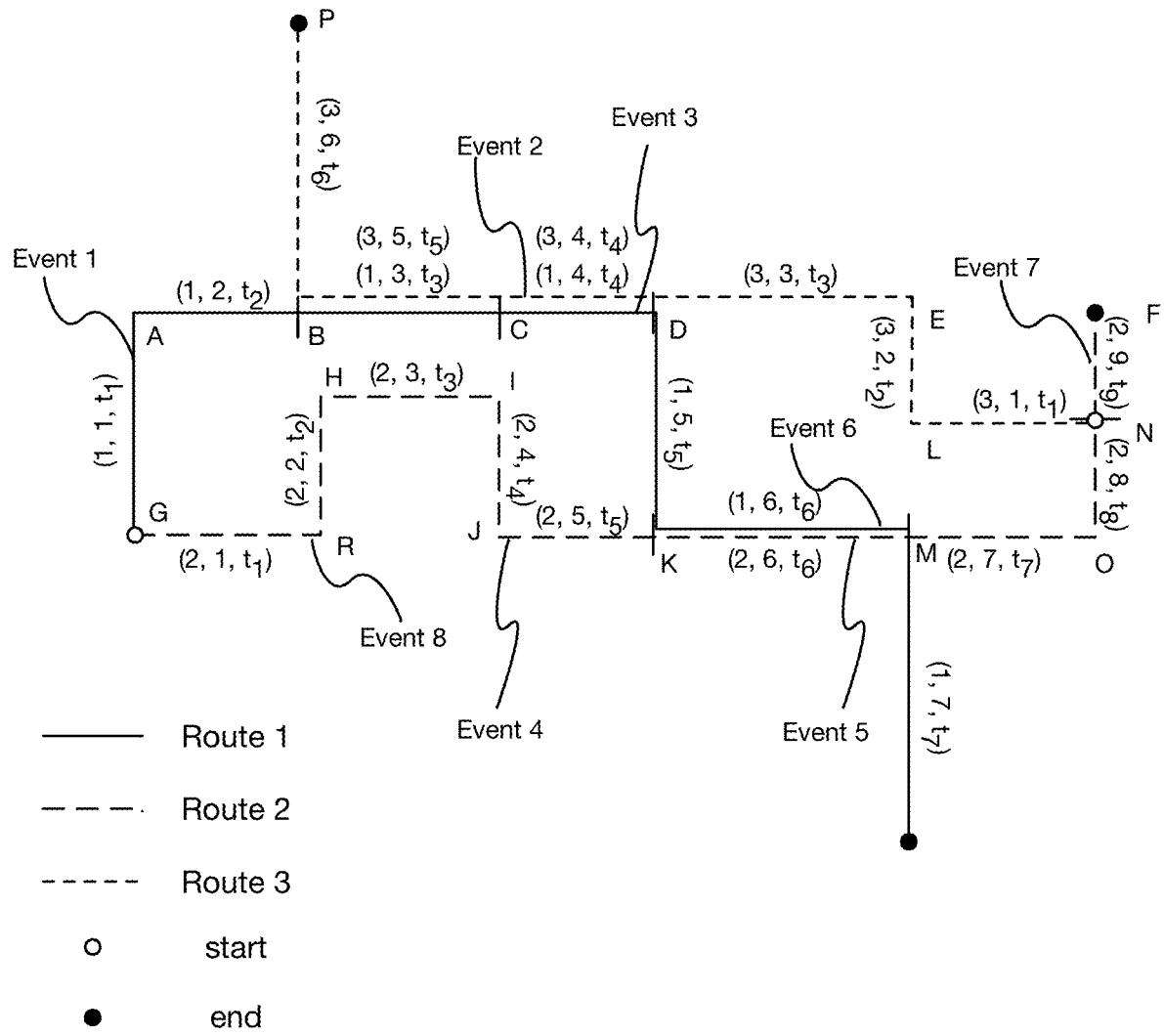

Organizing the set of inputs can include organizing the set of inputs based on the set of events and the set of route segments, which conceptually includes organizing the set of events into a set of groupings ("buckets"), such as those shown in FIGS. 3B-3F, which are determined based on the events and associated route segments of FIG. 3A. The events that occur during a set of multiple routes (e.g., Routes 1, 2, and 3), which can be additionally associated with multiple users and/or multiple time points, are organized and aggregated according to the route segment linked to the event (e.g., in S120), which can be determined based on location information, such as location information collected at a sensor system as described in S110. As more and more data from multiple users and multiple routes comes in, the propensity for collision of particular route segments (e.g., having a large number of events, having a large number of severe events, etc.) can be determined and optionally quantified (e.g., in S140). This then forms a sample representative of the overall ambient driving condition.

The set of events and route segments can additionally or alternatively be organized based on temporal parameters and/or one or more attributes, which can function, for instance to enable risk scores to be determined and used to produce an output in S150 which most closely match an environment of the driver. In some variations, for instance, the time at which an event occurs is organized based on the time of day at which it occurs (e.g., in 1-hour segments, in 12-hour segments, in 3-hour segments, etc.), such that a risk score is ultimately determined for each route segment at each hour of the day to result in 24 different buckets of event—route segment pairs. Additionally or alternatively, any other attributes (e.g., weather condition) can be used to organize the set of events.

In a first set of variations, S125 includes organizing the set of potential collision events and the set of collision events such that the event is linked to the route segment and/or route segments at which it occurs, wherein these event-segment pairs can optionally be further organized based on temporal information and/or other attributes, such that risk scores can be tailored to particular environments (e.g., time of day, weather conditions, etc.) which a driver may be driving in.

In specific examples, the set of events and their associated route segments are determined based on the driving of an aggregated set of users along with one or more databases of collision events.

In additional or alternative examples, the events are their associated route segments are further organized based on which hour of the 24-hour day the event occurred in.

In a second set of variations, the potential collision events and the collision events are collected in absence of database information.

In a third set of variations, the collision events are collected only from a set of databases, wherein the potential collision events are collected based on sensors associated with an aggregated set of users.

Additionally or alternatively, S125 can be otherwise suitably performed.

4.4 Method: Determining a Model S130

The method 100 can include determining a model S130, wherein the model functions to enable the determination of risk score associated with each of the set of route segments (e.g., predetermined route segments, dynamically determined route segments, etc.). Additionally or alternatively, the model can function to enable the determination of the risk associated with an entire route and/or any other suitable outputs (e.g., as in S150). S130 can additionally or alternatively function to assess the risk associated with potential collision events (e.g., based on a comparison with actual collision events/data), and/or can perform any other suitable functions.

In preferred variations, the model preferably essentially enables the correlation of driving behavior (as represented in potential collision events) with real collision data, such as that in a different format from a database, to enable a determination of risk associated with each of a route segment. In specific examples, this enables the sparse actual collision data (e.g., as there is relatively little collision data due to their relatively infrequent occurrence) to be combined with and/or correlated with risky driving behavior from sensor data to enable a robust risk score to be determined for each of a set of route segments (e.g., even those not associated with a documented collision).

This can in turn enable, for instance, risky driving behavior which is found to correlate to collisions to be flagged to one or more drivers (e.g., a driver performing the risky behavior, a driver in proximity to the risky driver, etc.), such as through a notification (e.g., a real-time notification) and/or any of the outputs described in S150.

S130 is preferably performed in response to S125, but can additionally or alternatively be performed in response to S120, in response to S110, prior to S110 (e.g., for producing an output in S150 based on the model), and/or at any other suitable times. Additionally or alternatively, S130 can be performed at any or all of: multiple times throughout the method (e.g., continuously, at a predetermined frequency, etc.), in response to a trigger, and/or at any other suitable times. Further additionally or alternatively, the method 100 can be performed in absence of S130 (e.g., wherein a model is already determined).

The model in S130 is preferably determined based on the organized inputs described in S125, but can additionally or alternatively be determined based on the processed inputs in S120, the inputs in S110, and/or any other suitable information.

The model preferably outputs a risk score associated with each of the set of route segments. Additionally or alternatively, the model can output a risk score associated with each route. Further additionally or alternatively, the model can produce any other suitable outputs (e.g., a driver risk score) and/or any other suitable outputs.

In a preferred set of variations, the output of the model includes a lookup table which includes at least the set of predetermined route segments (e.g., in a first column) and a risk score (e.g., single risk score, scalar risk score, vector or risk scores associated with each potential event, etc.) associated with each route segment. The table can additionally or alternatively be divided among different hours of the day and/or other attributes (e.g., table for each hour of the day and each type of weather). Further additionally or alternatively, the model can include any other suitable outputs, such as an algorithm, decision tree, other table, and/or any other outputs.

The model is preferably determined and used to determine the outputs at least once (e.g., wherein the risk scores output by the model are used in each instance of S140 and/or S150). Additionally or alternatively, a model can be determined and/or updated multiple times (e.g., at a predetermined frequency, in response to new data being collected in S110, in response to new database information being collected, etc.).

In some variations, for instance, a set of risk scores is determined based on the model and data from a first aggregated set of drivers (equivalently referred to herein as users), wherein the risk scores are used for a second set of users (e.g., in the outputs of S150), wherein data associated with the second set of users is also collected and used to update the model, thereby producing an updated set of risk scores.

The model can include a single model and/or multiple models.

The model preferably includes a statistical model, wherein the statistical model functions to determine, as an output, a risk score associated with each route segment based on event data including both actual collision events (e.g., collected from a database and/or a sensor system) and potential collision events (e.g., collected from a database and/or a sensor system). The statistical model is preferably a generalized linear model (e.g., with a Poisson regression) but can additionally or alternatively include any or all of: another linear model, a non-linear model, a Bayesian approach, a least squares fit, and/or any other statistical and/or probabilistic models.

Additionally or alternatively, the model can include a machine learning model (e.g., deep learning model, neural network, CNN, RNN, etc.), one or more algorithms and/or equations, decision trees, and/or any other suitable models.

In a first set of variations, the model includes a statistical model, wherein the risk scores are determined by the model and based on a set of model inputs including: a set of potential collision events and their associated route segments, a set of collision events and their associated route segments, and optionally one or more collision and/or traffic parameters/statistics (e.g., from a database, from sensor information, etc.) associated with the region in which data is being collected. These parameters/statistics can optionally be used for instance, to enable a comparison and/or a correlation between events determined with a sensor system and those from a database. In specific examples (e.g., as shown in FIG. 7), these can include any or all of: a distance traveled per each particular route segment relative to all route segments (e.g., based on information collected at user devices, to enable a determination of an estimated collision frequency per route segment, etc.); an overall number of miles traveled in a region; an overall collision frequency (e.g., collisions per million miles) in a region; and/or any other suitable information.

In a second set of variations, the model includes one or more machine learning models trained based on any or all of: the event data, database data, and/or simulated data, wherein the machine learning model determines a predicted set of risk scores for a route and/or route segment.

In a third set of variations, the model includes a combination of statistical and machine learning models.

4.5 Method: Determining a Set of Risk Scores S140

The method 100 includes determining a set of risk scores S140, which functions to assess (e.g., quantify, rank, etc.) the propensity for risk (e.g., collision, potential collision, dangerous events, stressful driving conditions, etc.) associated with each of a set of route segments and subsequently any routes composed of these route segments, such as a route that a driver may plan to take.

S140 is preferably performed in response to S130 and S125, wherein the model in S130 is used to determine a set of risk scores, which can be used to assess an overall risk for a driver and/or other user (e.g., in light of particular route the vehicle is going to take, in light of all routes the driver has taken, etc.). S140 can additionally or alternatively be preferably performed in response to S110, S120, and/or can be performed at any or all of: multiple times throughout the method (e.g., continuously, at a predetermined frequency, etc.), in response to a trigger, and/or at any other suitable times. Further additionally or alternatively, the method 100 can be performed in absence of S140.

The set of scores preferably includes a set of segment risk scores, each of which quantifies the risk of a collision (e.g., of a route segment, or a route, etc.) on a particular route segment. Additionally any or all of a risk score (e.g., an entry in a risk score vector) can quantify the likelihood of encountering a driver exhibiting a particularly risky driving behavior (e.g., hard braking, aggressive acceleration, etc.), such as any or all of the potential collision events described in S120. Further additionally or alternatively, S140 can include determine a route risk score (e.g., as described below in aggregating risk scores), a driver risk score (e.g., based on the routes taken by the driver), a regional risk score (e.g., based on the routes in the region), and/or any other risk scores.

A segment risk score is preferably determined for each route segment, which can then be used (e.g., aggregated, added together, combined according to an algorithm and/or function, etc.) to determine a risk score associated with a route made up of a set of route segments. A risk score preferably indicates a high propensity for collision, but can additionally or alternatively indicate a high propensity for risky behavior, be unrelated to collision, and/or indicate any other suitable information. The segment risk score is preferably produced as an output of the model in S130 but can additionally or alternatively be otherwise produced.

The risk score can optionally include and/or be determined based on a set of sub-scores (e.g., corresponding to the risk of each of the set of events, as entries in a segment risk score vector, etc.), which can function, for instance, to enable discretion (e.g., filtering) based on a particular driving event (e.g., according to a user's preference). In some variations, for instance, in recommending a route to a user (e.g., in S150), the user can view and/or adjust the options based on the user's particular priorities and preferences. In specific examples, for instance, a user can prioritize minimizing any or all of the following when choosing a route: a level of driver aggression; a level of distracted drivers; stop-and-go traffic; and/or any other suitable parameters corresponding to the driving events described above and/or independent of the driving events above.

In determining a risk score based on a set of sub-scores (e.g., driving event sub-scores), the sub-scores can be combined in any suitable way, such as any or all of: added together; added in a weighted fashion, such as based on a severity of an event type (e.g., assigning a heavier weight to collision events versus dangerous events) and/or a likelihood of an event type; combining the sub-scores according to any number of algorithms and models (e.g., deep learning models); and/or otherwise combing the set of sub-scores.

Any or all of the risk scores can optionally be determined and/or adjusted based on driver-specific information and/or any other suitable parameters (e.g., current driving conditions, current sensor information, etc.). In some variations, the risk score associated with a segment and/or route can be adjusted and/or tailored based on driver preferences and/or historical information. In specific examples, for instance, for a driver who has a tendency to do hard braking, which could be especially risky in route segments with a high incidence of overspeeding (e.g., could cause a speeding tailgating vehicle to rear end the described vehicle when it brakes suddenly), the risk score associated with a segment associated with high incidence of overspeeding (e.g., driving over the speed limit, driving over the speed limit by a predetermined threshold, exceeding the speed limit by at least 5 miles/hour, exceeding the speed limit by at least 10 miles/hour, exceeding the speed limit by a threshold between 10 miles/hour and 30 miles/hour, exceeding the speed limit by at least 15 miles/hour, exceeding the speed limit by at least 20 miles/hour, exceeding the speed limit by at least 30 miles/hour, etc.) can be inflated for the particular driver.

Additionally or alternatively, the risk score can be otherwise determined.

S140 can optionally include validating a risk score and/or the processes (e.g., algorithms, models, etc.) involved in determining the safety score. In some variations, S140 accounts for a potentially low amount of data collected for collision events and/or dangerous events by aggregating drivers into ranges based on their driver behavior (e.g., a driver behavior score) and comparing a driving event rate aggregated for the set of drivers in the range. This can function to validate the safety score and its efficacy as a predictor of collision if it is determined, for instance, that an aggregated set of drivers associated with risky driver behavior experiences a higher collision rate than an aggregated set of drivers associated with less risky driver behavior. Additionally or alternatively, events associated with a second aggregated set of drivers can be used to validate the risk scores, the model itself can go through one or more validation processes, and/or validation can be otherwise optionally performed.

S140 can optionally include aggregating a set of segment risk scores to determine a route risk score. Aggregating the segment risk scores can include any or all of: summing scores (e.g., segment scores, normalized segment scores, etc.), averaging scores, determining a median score, selecting the highest segment risk score, adding in a weighted fashion (e.g., wherein the set of weights take into account a distance and/or other parameter of the segment), and/or otherwise combining the segment scores.

In some variations, a risk score for a route is determined by adding together the segment risk scores for the series of segments making up the route.

Additionally or alternatively, S140 can include any other suitable processes performed in any suitable order.

In a first set of variations, S140 includes calculating a segment risk score for each of a set of route segments with a model, wherein the segment risk scores can be aggregated together to determine the risk associated with any route.

In a second set of variations, S140 includes calculating a risk score for each of a set of potential routes, wherein calculating a safety score for the route includes calculating a safety score for each route segment of the route, wherein the safety score for each route segment is determined based on an aggressive acceleration sub-score, a hard braking sub-score, a phone use sub-score, a speeding sub-score, and a hard turn sub-score, and wherein the safety scores for each route segment are added together to determine the route safety score.

Additionally or alternatively, S140 can be otherwise suitably performed.

4.6 Method: Producing an Output Based on the Set of Risk Scores S150

The method 100 can optionally include producing an output based on the set of risk scores S150, which can function to perform any or all of: recommending a route to a driver; recommending an action associated with a route (e.g., while the driver is traversing the route); identifying and surfacing risky driving behavior; advising a driver on areas of improvement; recommending infrastructure changes; informing an insurance company and/or other entity of route and/or driver riskiness; and/or performing any other suitable function(s).

S120 is preferably performed in response to 140, but can additionally or alternatively be performed in response to S130, S125, S120, S110, and/or at any or all of: multiple times throughout the method (e.g., continuously, at a predetermined frequency, etc.), in response to a trigger, and/or at any other suitable times. Further additionally or alternatively, the method 100 can be performed in absence of S150.

S150 can include recommending a route to a driver based on the risk score(s) determined in S140. Recommending a route to a driver can optionally include recommending a route prior to the driver starting a trip, wherein the route is determined based on a user's starting point, destination, the risk score and/or a driver score, and optionally one or more driver preferences (e.g., aversion to driving routes that are associated with a high level of driver aggression, percentage increase in distance willing to be traveled for a less risky route, percentage increase in time willing to be spent for a less risky route, etc.). Additionally or alternatively, a route can be recommended while the user is driving, such as in an instance that a detour to the current route is preferable (e.g., based on a dynamically updated safety score, based on a change in user preference, based on a change in traffic, etc.), based on an input from the user (e.g., change in destination, prioritization of time to destination instead of safety, etc.), and/or recommended at any other suitable times.

Additionally or alternatively, S150 can include recommending an action associated with a route, such as any or all of: dynamically changing navigation to a less risky route, changing lanes, taking a detour (e.g., if a safety score drops below a predetermined threshold), pulling off of a roadway, advising the driver on an optimal time of day to take the trip, and/or any other suitable actions.

Further additionally or alternatively, S150 can include identifying and optionally alerting the driver to various information, such as any or all of: collision-prone zones; a collision risk parameter (e.g., probability of collision per mile, probability of collision per route, etc.) and/or a visual indication (e.g., on a collision heat map); a risky behavior associated with the driver (e.g., distraction level above a predetermined threshold, increasing aggression level, etc.); risky behavior associated with the driver of a nearby vehicle; an improvement area and/or associated tips for the driver; and/or any other suitable information.

Further additionally or alternatively, S150 can include recommending and/or advising on infrastructure changes and/or policy changes based on a risk score associated with actual or proposed infrastructure features. In some variations, for instance, S150 includes advising individuals or groups (e.g., road safety policymakers, urban/state/federal level groups, etc.) on the risk associated with various features and/or changes, such as any or all of: widening lanes of a roadway, introducing medians, changing a 4-way stop into a roundabout, adding a lane to a highway, introducing a left turn lane to an intersection, changing speed limits, and/or any other suitable infrastructure.

Figure 5:
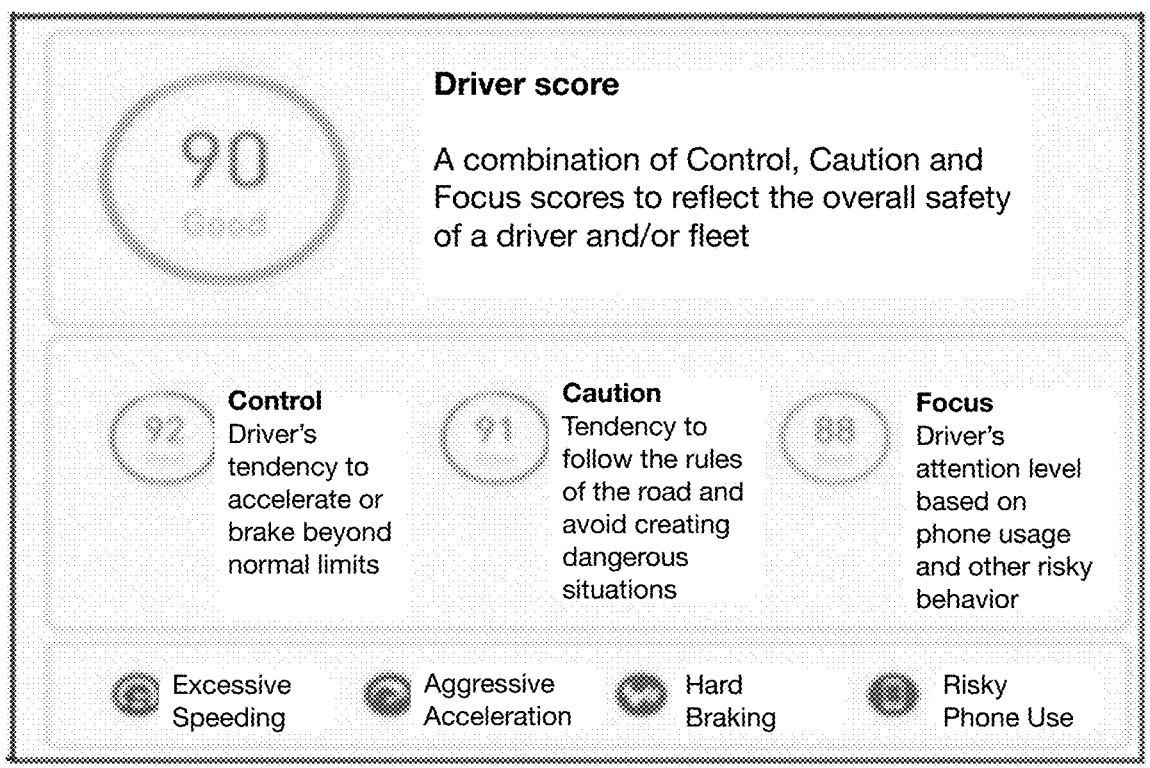
FIG. 5 depicts a variation of a driver score visualization provided as an output in variations of the method 100.
Figure 6:
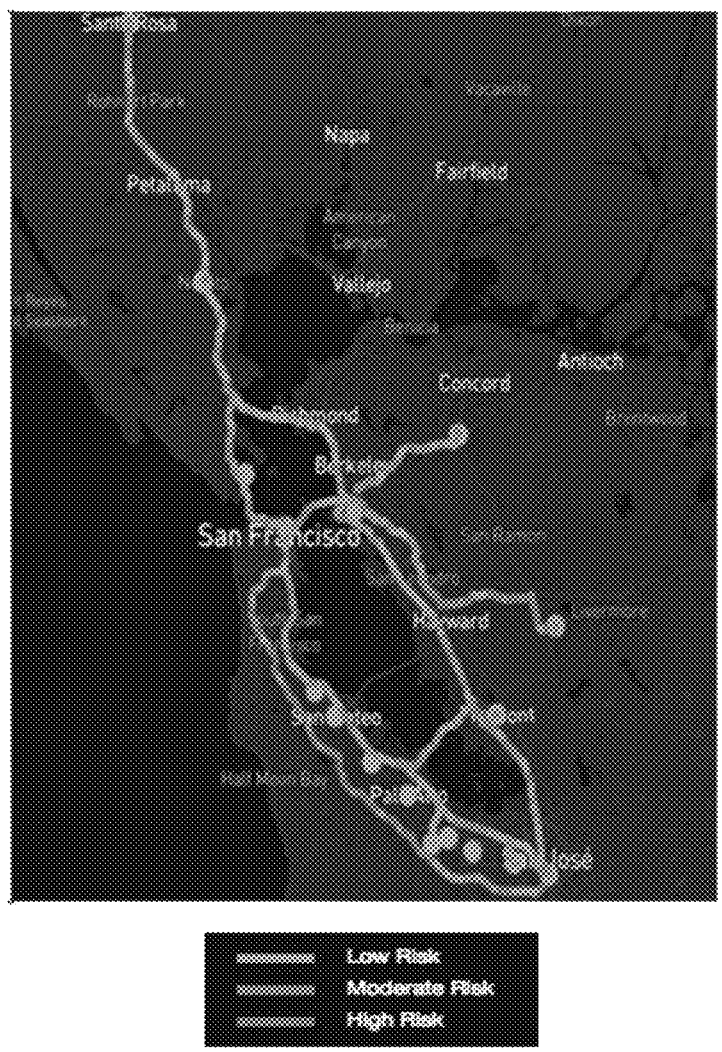
FIG. 6 depicts a variation of a route risk visualization provided as an output in variations of the method 100.

Further additionally or alternatively, S150 can include producing and/or presenting a visual output, such as any or all of: a visualization of a score (e.g., to be displayed at a client application), such as a safety score of a route (e.g., as shown in FIG. 6) and/or a score associated with a driver (e.g., as shown in FIG. 5); a heat map showing areas associated with high propensity for collision; and/or any other suitable visualizations.

Further additionally or alternatively, S150 can include informing one or more entities of risk scores. In some variations, for instance, S150 can assess risk for individual drivers, regions, groups of drivers, drivers as a whole, and/or any other groupings, which can enable an insurance company to determine and/or adjust insurance rates accordingly. In specific examples, an insurance company can assess risk and/or changes in risk associated with a driver (e.g., moves to new area with riskier routes, starts taking different routes, historical routes taken, etc.) such that the insurance company can determine his or her insurance rate accordingly.

Further additionally or alternatively, S150 can produce one or more fleet management outputs, such as a change in routes assigned to one or more vehicles (e.g., trucks, autonomous vehicles) in the fleet based on the route risks.

4.7 Method: Variations

Figure 8:
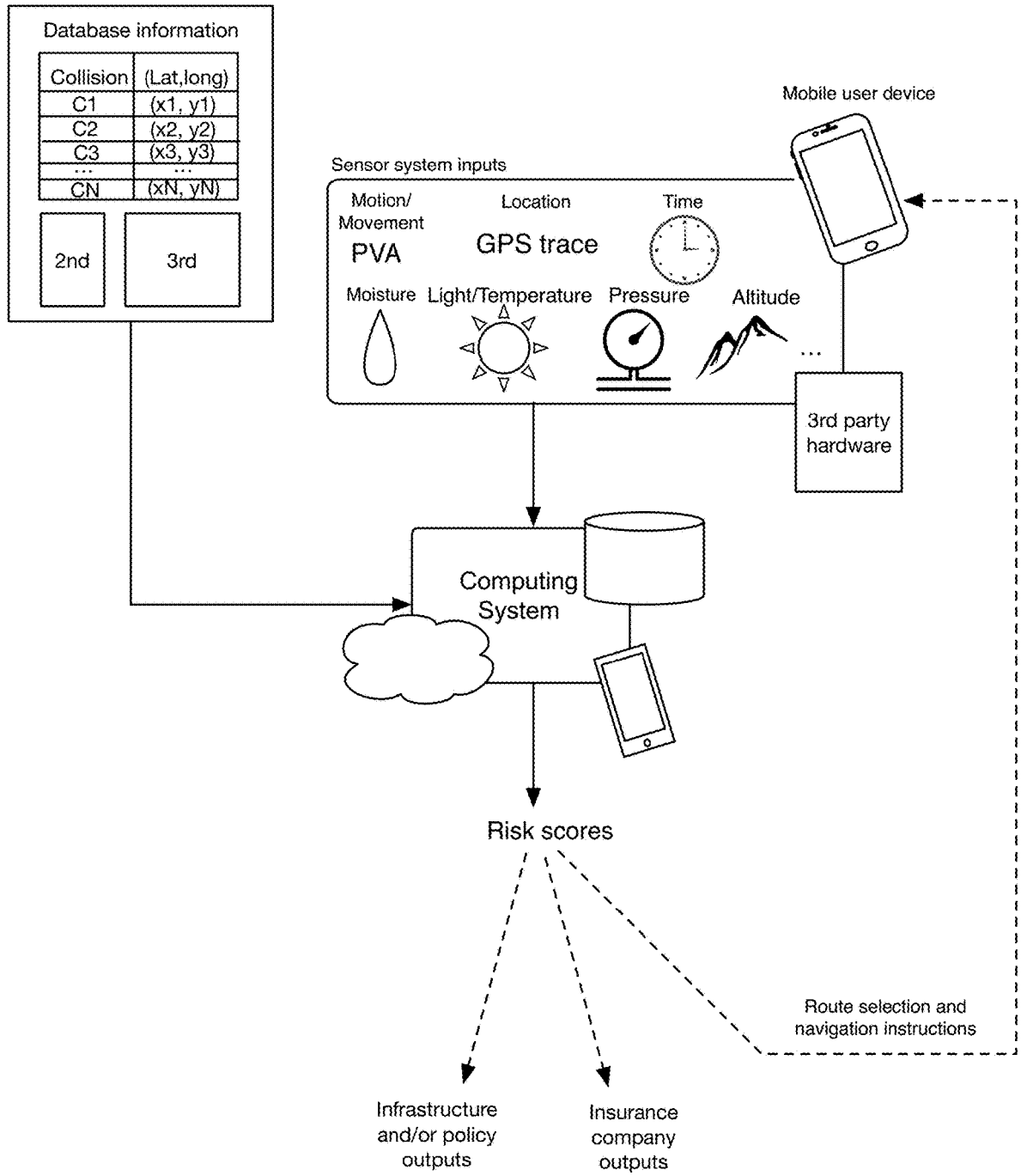
FIG. 8 depicts a variation of a set of inputs involved in the method 100.

In one variation (e.g., as shown in FIG. 8), the method 100 includes: collecting data from a sensor system of a user device, which is used to determine a driver's behavior (e.g., driver's acceleration patterns, driver's hard braking, driver's mobile device usage and interactions, driver's speeding, and driver's dangerous turn patterns) associated with the driver's traversal of a route and location information (e.g., GPS data) characterizing the location of the route; linking the data with road infrastructure (e.g., routes, roadways, intersections, etc.) through GIS information and any number of GIS tools (e.g., lat-long variable, Geo-hash, etc.); collecting database information associated with actual collision events and their locations; determining a set of events such as any or all of a collision event and a set of potential collision events (e.g., an aggressive acceleration event, a hard braking event, a mobile device usage event, a speeding/overspeeding event, a dangerous turn event, etc.); organizing data from multiple drivers and multiple routes to produce, with a model, an aggregated assessment of the risk at each of a set of route segments; determining one or more scores (e.g., risk scores) associated with each of the set of route segments and/or a set of routes composed of the route segments; and producing an output (e.g., recommending a route) based on the scores.

In specific examples, the set of potential collision events is determined based on inputs collected from a set of sensor systems (e.g., of user devices, of mobile devices, etc.) of an aggregated set of users, and the set of collision events is determined from one or both of the inputs collected from the set of sensor systems and a set of database information.

In a second variation, additional or alternative to the first, the method 100 includes determining a model for determining a set of risk scores, wherein determining the model comprises: collecting data from a sensor system of a user device, which is used to determine a driver's behavior (e.g., driver's acceleration patterns, driver's hard braking, driver's mobile device usage and interactions, driver's speeding, and driver's dangerous turn patterns) associated with the driver's traversal of a route and location information (e.g., GPS data) characterizing the location of the route; linking the data with road infrastructure (e.g., routes, roadways, intersections, etc.) through GIS information and any number of GIS tools (e.g., lat-long variable, Geo-hash, etc.); collecting database information associated with actual collision events and their locations; determining a set of events such as any or all of a collision event and a set of potential collision events (e.g., an aggressive acceleration event, a hard braking event, a mobile device usage event, a speeding/overspeeding event, a dangerous turn event, etc.); organizing data from multiple drivers and multiple routes to produce, with a model, an aggregated assessment of the risk at each of a set of route segments; determining one or more scores (e.g., risk scores) associated with each of the set of route segments and/or a set of routes composed of the route segments.

In specific examples, the model is a statistical model such as a generalized linear models.

In additional or alternative specific examples, the model is a machine learning model.

In a third variation, additional or alternative to the first and second, the method includes: collecting data from a sensor system of a user device, which is used to determine a driver's behavior (e.g., driver's acceleration patterns, driver's hard braking, driver's mobile device usage and interactions, driver's speeding, and driver's dangerous turn patterns) associated with the driver's traversal of a route and location information (e.g., GPS data) characterizing the location of the route; linking the data with road infrastructure (e.g., routes, roadways, intersections, etc.) through GIS information and any number of GIS tools (e.g., lat-long variable, Geo-hash, etc.); collecting database information associated with actual collision events and their locations; determining a set of events such as any or all of a collision event and a set of potential collision events (e.g., an aggressive acceleration event, a hard braking event, a mobile device usage event, a speeding/overspeeding event, a dangerous turn event, etc.); organizing data from multiple drivers and multiple routes to produce, with a model, an aggregated assessment of the risk at each of a set of route segments; determining one or more scores (e.g., risk scores) associated with each of the set of route segments and/or a set of routes composed of the route segments; producing an output (e.g., recommending a route) based on the scores; collecting the information as described above as the user traverses a route; and updating the model based on the updated information.

Additionally or alternatively, the method 100 can include producing any other suitable outputs and/or any other suitable processes.

Although omitted for conciseness, the preferred embodiments include every combination and permutation of the various system components and the various method processes, wherein the method processes can be performed in any suitable order, sequentially or concurrently.

As a person skilled in the art will recognize from the previous detailed description and from the figures and claims, modifications and changes can be made to the preferred embodiments of the invention without departing from the scope of this invention defined in the following claims.

We claim:

1. A method for route selection for a driver, the method comprising:
receiving a starting point and a destination;
determining a first series of route segments from a predetermined set of route segments based on a $1^{st}$ route from the starting point to the destination;
determining a second series of route segments from the predetermined set of route segments based on a $2^{nd}$ route from the starting point to the destination;
determining a $1^{st}$ route risk score and a $2^{nd}$ route risk score, wherein determining the $1^{st}$ route risk score and the $2^{nd}$ route risk score comprises:
with a model comprising a plurality of model parameters, determining a segment risk score associated with each of the first and second series of route segments, wherein determining the segment risk score comprises:
receiving motion information from a set of mobile user devices associated with a set of drivers driving a set of vehicles, the motion information comprising: location information generated by a mobile user device of the set of mobile user devices and device handling information associated with the driver handling the mobile user device;

receiving collision information from a database;

based on the motion information, determining a set of potential collision events comprising a set of near-miss events; and determining a set of collision events based on the collision information, wherein the plurality of model parameters comprises a first parameter associated with the set of near-miss events and a second parameter associated with the set of collision events;

for the $1^{st}$ route, aggregating the first series of segment risk scores to determine the $1^{st}$ route risk score;

for the $2^{nd}$ route, aggregating the second series of segment risk scores to determine the $2^{nd}$ route risk score;

selecting a route from the $1^{st}$ route and the $2^{nd}$ route based on the $1^{st}$ and $2^{nd}$ route risk scores; and at a mobile user device, providing navigation instructions to the driver based on the selected route.

2. The method of claim 1, wherein the motion information further comprises positional information collected with the mobile user device of the driver during a traversal of the selected route, wherein the mobile user device comprises an inertial sensor, further comprising transforming a set of inertial measurements of the inertial sensor into the positional information.

3. The method of claim 2, further comprising updating the plurality of model parameters of the model based on the motion information.

4. The method of claim 3, wherein the motion information further comprises location information associated with a second set of mobile user devices associated with a second set of drivers.

5. The method of claim 1, further comprising presenting the $1^{st}$ and $2^{nd}$ route risk scores to the driver, wherein the selected route is further determined based on a driver input in response presenting the $1^{st}$ and $2^{nd}$ route risk scores to the driver.

6. The method of claim 1, further comprising receiving a time of day of associated with a position of the driver at the starting point, wherein each of the segment risk scores is further determined based on the time of day.

7. The method of claim 1, wherein determining the segment risk score further comprising receiving information from a second database, the second database separate and distinct from the first database.

8. The method of claim 7, wherein the second database comprises a collision frequency associated with a region, wherein the region comprises the $1^{st}$ route and the $2^{n}$d route.

9. The method of claim 1, further comprising transmitting a selected route risk score to an entity.

10. The method of claim 9, wherein the entity is an insurance company associated with the driver.

11. The method of claim 1, wherein the set of drivers comprises at least 1,000 drivers.

12. The method of claim 1, wherein the set of collision events is further determined based on the motion information.

13. The method of claim 1, wherein the set of potential collision events comprises:

an acceleration parameter above a predetermined threshold of a vehicle of the set of vehicles;

a braking parameter below a predetermined time threshold of a vehicle of the set of vehicles; and a mobile device usage above a predetermined threshold of a driver of the set of drivers.

14. The method of claim 1, wherein the motion information further comprises an arrangement of the mobile user device within a vehicle of the set of vehicles during driving.

15. The method of claim 1, wherein determining the set of potential collision events based on the sensor information comprises:

determining satisfaction of a vehicle acceleration threshold;

determining a driver behavior based on the device handling information; and based on the driver behavior and the satisfaction of the vehicle acceleration threshold, determining a near-miss event.

16. A method for determining a route risk score associated with a route, the method comprising:

determining a series of route segments making up the route based on a predetermined set of route segments from a $1^{st}$ database;

receiving the predetermined set of route segments from the $1^{st}$ database;

receiving a motion dataset from a set of mobile user devices associated with a set of multiple drivers, the motion dataset comprising: an inertial dataset and a location dataset;

based on the motion dataset, determining vehicle movement features and mobile device motion features, the mobile device motion features comprising device handling information;

determining a set of collision events based on a set of collision identifiers and a corresponding set of locations, each received from a $2^{nd}$ database;

with a model, based on the vehicle movement features and the mobile device motion features dataset, determining a set of potential collision events comprising near-collision events;

determining a segment risk score associated with each of the series of route segments, thereby determining a series of segment risk scores;

aggregating the series of segment risk scores to determine the route risk score; and at a mobile user device, triggering an action based on the route risk score.

17. The method of claim 16, wherein the $2^{nd}$ database is separate and distinct from the $1^{st}$ database.

18. The method of claim 16, wherein the action comprises providing a set of navigation instructions to a driver based on the route risk score.

19. The method of claim 18, wherein the set of multiple drivers comprises the driver.

20. The method of claim 16, wherein the set of collision events is further determined based on the vehicle movement features.

21. The method of claim 16, wherein the model comprises a statistical model.

22. The method of claim 21, wherein the statistical model is a generalized linear model.

* * * * *